(12) United States Patent
Ueda et al.

(10) Patent No.: US 6,289,102 B1
(45) Date of Patent: *Sep. 11, 2001

(54) APPARATUS AND METHOD FOR PREVENTING UNAUTHORIZED USE OF INFORMATION RECORDED ON AN INFORMATION RECORDING MEDIUM

(75) Inventors: Hiroshi Ueda, Hirakata; Yoshihisa Fukushima; Motoshi Ito, both of Osaka; Makoto Tatebayashi, Takarazuka; Natsume Matsuzaki, Mino, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/849,785

(22) PCT Filed: Oct. 4, 1996

(86) PCT No.: PCT/JP96/02901

§ 371 Date: Oct. 1, 1997

§ 102(e) Date: Oct. 1, 1997

(87) PCT Pub. No.: WO97/14147

PCT Pub. Date: Apr. 17, 1997

(30) Foreign Application Priority Data

Oct. 9, 1995 (JP) ........................................ 7-261266

(51) Int. Cl.$^7$ .................................................. G11B 20/10

(52) U.S. Cl. .............................................................. 380/201

(58) Field of Search ............................. 713/100; 360/69; 380/21, 22, 3, 4, 201

(56) References Cited

U.S. PATENT DOCUMENTS

| | | | |
|---|---|---|---|
| 4,458,315 | * | 7/1984 | Uchenick ................................. 380/4 |
| 4,462,078 | * | 7/1984 | Ross ........................................ 380/4 |
| 4,562,495 | * | 12/1985 | Bond et al. ....................... 360/78.04 |
| 5,513,260 | * | 4/1996 | Ryan .................................... 380/200 |
| 5,761,301 | * | 6/1998 | Oshima et al. ........................ 705/57 |
| 5,778,395 | * | 7/1998 | Whiting et al. ..................... 707/204 |
| 5,802,174 | * | 9/1998 | Sako et al. ........................... 380/201 |
| 5,883,958 | * | 3/1999 | Ishiguro et al. ...................... 705/57 |
| 5,915,018 | * | 6/1999 | Aucsmith ............................ 380/201 |
| 5,917,910 | * | 6/1999 | Ishiguro et al. ...................... 705/57 |
| 5,982,886 | * | 11/1999 | Itami et al. ........................... 705/57 |

FOREIGN PATENT DOCUMENTS

| | | | |
|---|---|---|---|
| 62-89275 | * | 4/1987 | (JP) . |
| 2-115956 | * | 4/1990 | (JP) . |
| 3-137748 | * | 6/1991 | (JP) . |
| 4-256196 | * | 9/1992 | (JP) . |
| 6-133314 | * | 5/1994 | (JP) . |
| 6-169307 | * | 6/1994 | (JP) . |
| 7-21688 | * | 1/1995 | (JP) . |
| 7-85574 | | 3/1995 | (JP) . |
| 7-249264 | | 9/1995 | (JP) . |
| 7-288798 | * | 10/1995 | (JP) . |

OTHER PUBLICATIONS

International Search Report, Feb. 12, 1997.*

* cited by examiner

Primary Examiner—Mark R. Powell
(74) Attorney, Agent, or Firm—Ratner & Prestia

(57) ABSTRACT

An information recording medium includes a lead-in area and a data recording area. Key information is recorded in the lead-in area. Scrambled data is recorded in the data recording area. The scrambled data is descrambled based on the key information.

28 Claims, 22 Drawing Sheets

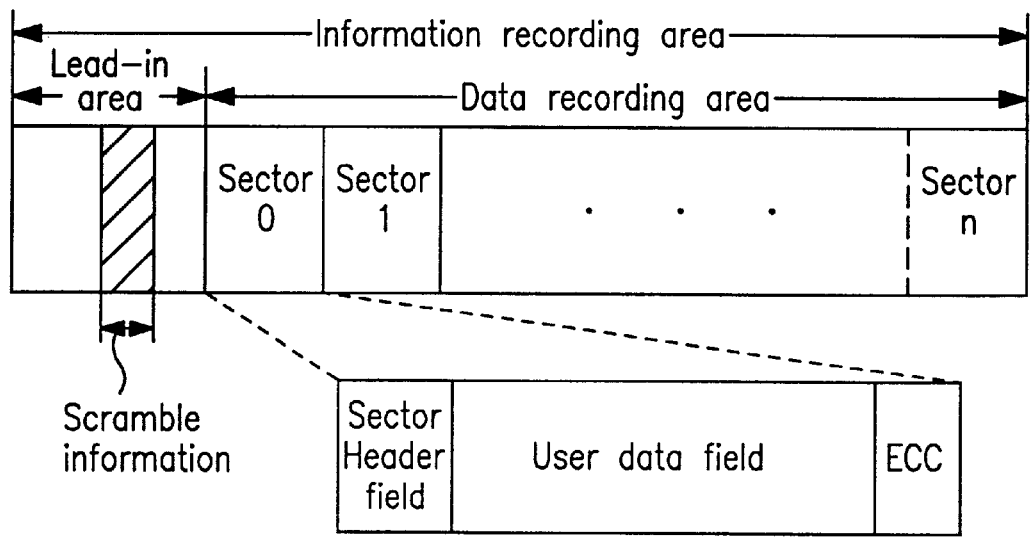

Initial value table for pseudo-random number sequence

| Scramble seed | Scramble initial value |
|---|---|
| Seed 1 | Scramble initial value 1 |
| Seed 2 | Scramble initial value 2 |
| ... | ... |
| Seed n | Scramble initial value n |

FIG. 9
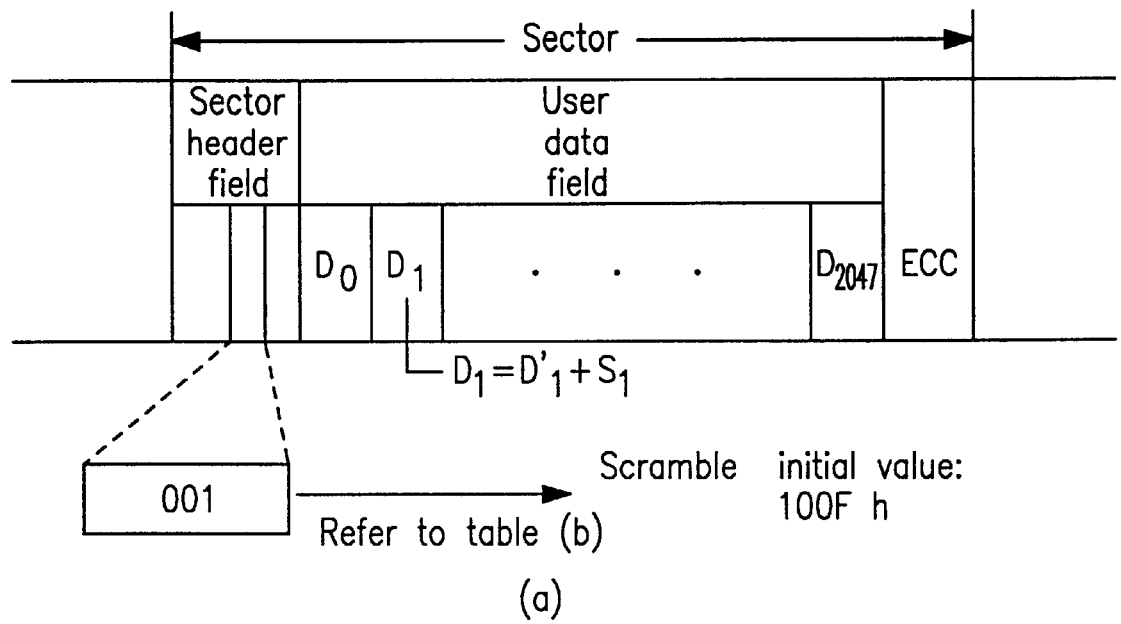
(a)
| Bit string | Scramble initial value | Pseudo-Random number sequence $S_0$ $S_1$ ... $S_{2047}$ | | |
|---|---|---|---|---|
| 0 0 0 | 0000h | $A_0$ | $A_1$ ... | $A_{2047}$ |
| 0 0 0 | 100F h | $B_0$ | $B_1$ ... | $B_{2047}$ |
| ... | ... | ... | | |
| 0 0 0 | 5FFFh | $C_0$ | $C_1$ ... | $C_{2047}$ |
(b)
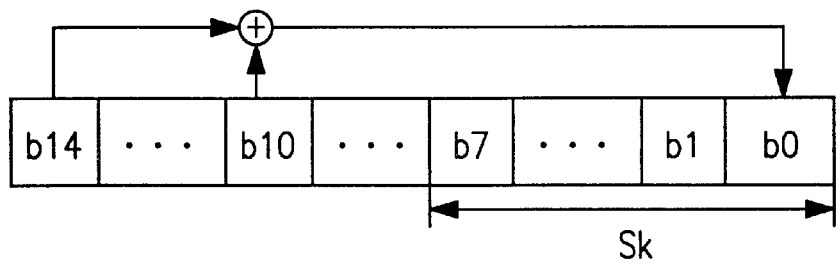
(c)

*FIG.12*
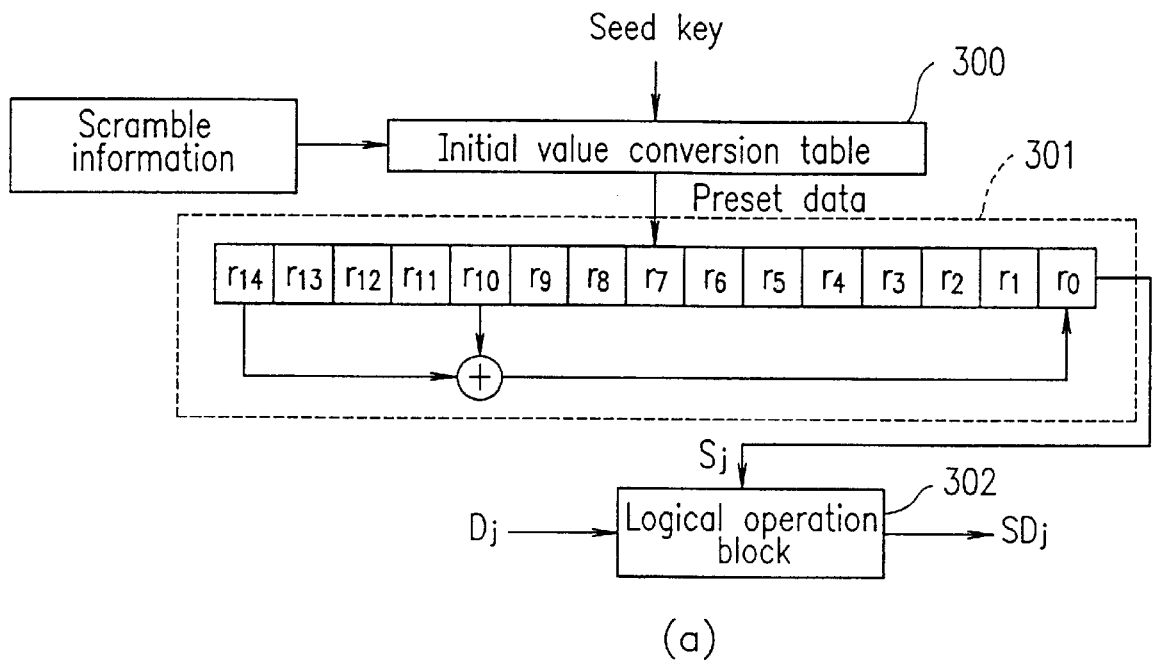
(a)
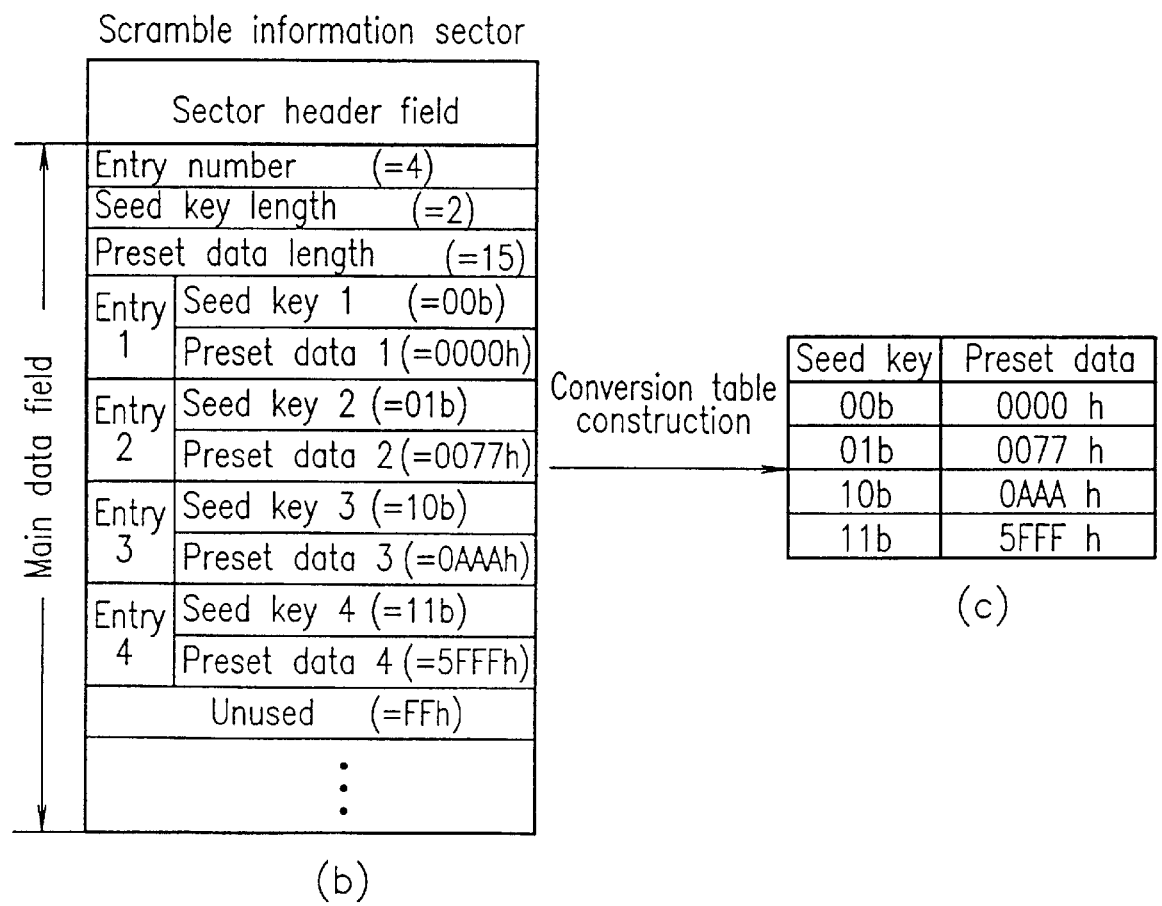
(b)
(c)

APPARATUS AND METHOD FOR PREVENTING UNAUTHORIZED USE OF INFORMATION RECORDED ON AN INFORMATION RECORDING MEDIUM

THIS APPLICATION IS A U.S. NATIONAL PHASE APPLICATION OF PCT INTERNATIONAL APPLICATION PCT/JP96/02901.

TECHNICAL FIELD

The present invention relates to an information recording medium for recording information signal containing program data, audio information and video information, an information reproducing device for reproducing the information recorded in the information recording medium and a method for reproducing the information.

BACKGROUND ART

A floppy disk and a CD-ROM (Compact Disk-Read Only Memory) are conventionally known as an information recording medium for program data, audio information and video information. In particular, the CD-ROM is widely used for the distribution of various softwares because of its large capacity of more than 600 MB and low production cost.

On the other hand, the promotion of high speed of a personal computer in recent years has increased the demand for outputting video and audio data (hereinafter, referred to as AV data) on the personal computer. For example, a digital data file where data is compressed by video image compression system called MPEG 1 (Moving Picture Experts Group) is recorded on CD-ROM, and an application for distributing such a CD-ROM has been increasingly available. However, since the MPEG 1 system generally compresses video data which requires a large capacity at a high compression ratio, quality of video images is significantly degraded. Therefore, the MPEG 1 is unsuitable for use where high quality in video images is required, such as movies or the like.

In recent years, development for recording high quality video data on an optical disk having a large capacity close to 5 GB, using a higher performance video image compression system called MPEG 2 system has been pursued. Capitalizing on the large capacity, the optical disk called DVD (Digital Video Disk) can record high quality digital AV data for two hours or more, and thus greatly expected as an AV data recording medium of the next generation. On the other hand, the DVD is expected to allow for reproduction of high quality AV data on a personal computer by a DVD drive for reproducing DVD in connection to the personal computer. In addition, the DVD is expected to substitute for the CD-ROM as a medium for distributing calculator software.

However, when the DVD drive as a peripheral device for the personal computer, commercially available, digital data recorded in the DVD may be output to the personal computer, and may easily be copied on a rewriting type medium, such as a hard disk nor an MO (Magneto-Optical Disk). Easy copying of the digital AV data causes problems such as illegal copying of the AV data recorded in the DVD without the permission of the copyright holder and distribution of altered AV data. This makes it extremely difficult to protect the copyright. This brings about a disadvantage not only to the copyright holder of the data, but also possibly to users in the case where the copyright holder sets the price in view of unauthorized copies being made, or does not produce disks for fear of alteration of the data. Hereinafter, the problem described above is referred to as a first problem.

On the other hand, as uses for the information recording medium where the AV data is recorded, a variety of uses are considered. In some uses among these uses, the fact that the information recording medium can be reproduced in any reproducing device causes a problem. In such a use, it is preferable to differentiate a reproducing device capable of reproducing and a reproducing device incapable of reproducing. For example, for disks generally called "karaoke" disks where video data including words corresponding to reproduced music is recorded, there exist two types of disks: disks privately used in households (hereinafter, referred to as consumer disks) and disks used in a facility such as where customers enjoy karaoke for a predetermined charge (hereinafter, referred to as industrial disks). Since the industrial disks are produced under the premise that they are supplied in a large quantity to limited users, they are supplied at a low price. On the other hand, consumer disks are sold at a high price due to individual sale.

However, in the case where the industrial disks and the consumer disks have entirely the same format, there is a possibility of selling the industrial disks as the consumer disks at low price in the consumer market. This prevents the consumer disks from being distributed in a proper price in the market, thus resulting in a disadvantage for disk manufacturers and users who purchase the consumer disks through the normal route. Therefore, it is desirable to differentiate the reproducing device capable of reproducing the consumer disks from that capable of reproducing industrial disks in such a use. For another example, a disk having the content which causes an ethical problem may be reproduced. The criterion which determines whether or not the disk is ethical is varied from country to country. Therefore, a disk to be reproduced in a certain country may not be desired to be reproduced in another country. Therefore, a mechanism is required which allows a disk which causes an ethical problem to be reproduced only in a specific country where the sale thereof is permitted. As described above, there has been a problem that the reproducing device capable of reproduction and the reproducing device incapable of reproduction cannot be differentiated depending on the use. Hereinafter, this problem is referred to as a second problem.

As one means for solving the two aforementioned problems, there is a method of scrambling (encrypting) data to be recorded in the information recording disk for recording. More specifically, regarding the first problem, at the time of a copying operation in the personal computer, data scrambled based on a key is transmitted back, and a key for descrambling is not transmitted back, thus preventing the copying operation (the copying operation is performed, but since the descrambling is not effected, the copying operation makes no sense).

Furthermore, regarding the second problem, it is possible to classify a device capable of descrambling and a device incapable of descrambling by producing disks which are differently scrambled depending on the contents of the disks. Thus, the scrambling (encrypting) of the recorded data is effective on the two aforementioned problems. However, another problem is a method for descrambling data or how to specify a key for descrambling data.

As a first conventional example for encrypting in a data field, a system of recording an encrypting key in a main data field of a sector different from an encrypted data sector was proposed in a CD-ROM in FIG. 3 of Japanese Laid-Open Patent Publication No. 7-249264. In this conventional example, data reproduction is realized by recording encrypted data and an encrypting key thereof in the CD-ROM at the time of recording, and decrypting the encrypted data after executing a reading command of the encrypting key from a personal computer to a reproducing device at the time of reproducing. This method has an advantage in that the encrypting key can be easily changed.

Furthermore, as a second conventional example, as shown in FIG. 3 of Japanese Laid-Open Patent Publication No. 7-85574, a system of recording an encrypting key in an area in a disk which the optical head of the reproducing device does not scan was proposed. In this conventional example, since the encrypting key is prevented from being read from a general personal computer, the encrypting key is not copied in a copying operation, and thus an illegal copying operation makes no sense.

However, since the encrypting key of the first conventional example is recorded in the main data field of the sector, it is possible to easily read the encrypting key used at the time of recording the disk from a general personal computer. Therefore, since users can read the encrypting key and the encrypted data, it is highly possible to decrypt the encrypting.

Furthermore, in the second conventional example, the encrypting key is recorded in the area which the optical head of the reproducing device does not scan. In order to read the encrypting key, therefore, reading means dedicated to reading the encrypting key is required, in addition to reading means for reading data from the data recorded area, thus causing a problem.

In both of the first and second conventional examples, data is encrypted with a single encryption key, thereby failing to ensure a sufficient security level in the case where the encryption key is read out by a third party.

The present invention has an objective of providing an information recording medium having a data structure which ensures the prevention of the content recorded in the information recording medium from being illegally copied so as to realize secured copyright protection, an information reproducing device capable of reproducing data from the information recording medium without providing a special data reading means, and solving the first and second problems, and a method for reproducing information.

DISCLOSURE OF THE INVENTION

An information recording medium according to the present invention includes a lead-in area and a data recording area. Key information is recorded in the lead-in area. Scrambled data is recorded in the data recording area. The scrambled data is descrambled based on the key information.

According to another aspect of the invention, an information recording medium includes a lead-in area and a data recording area. First key information is recorded in the lead-in area. Second key information and scrambled data are recorded in the data recording area. The scrambled data is descrambled based on information obtained by converting the second key information based on the first key information.

In one embodiment of the invention, the data recording area is divided into a plurality of sectors. Each of the plurality of sectors includes a sector header field where information for identifying the sector is recorded and a main data field where the scrambled data is recorded. The second key information is recorded in the sector header field.

In another embodiment of the invention, the second key information is encrypted by the first key information, and the information is obtained by decrypting the encrypted second key information.

In still another embodiment of the invention, the first key information is encrypted by master key information.

In yet another embodiment of the invention, a plurality of first key information is recorded in the lead-in area, and the plurality of first key information are encrypted by a plurality of different master key information.

In another embodiment of the invention, a scramble flag for indicating whether or not data recorded in the data recording area is scrambled is further recorded in the information recording medium.

In still another embodiment of the invention, the data recording area is divided into a plurality of sectors. Each of the plurality of sectors includes a sector header field where information for identifying the sector is recorded and a main data field where the scrambled data is recorded. The scramble flag is recorded in the sector header field.

In yet another embodiment of the invention, the data recording area includes an area where a plurality of files are recorded and a file management area where information for managing the plurality of files is recorded, and the scramble flag is recorded in the file management area.

In another embodiment of the invention, mutual authentication key information for performing mutual authentication between a reading device for reading the scrambled data and a decoding device including a descramble circuit for descrambling the scrambled data is further recorded in the lead-in area.

In still another embodiment of the invention, the information is an initial value for generating a random number sequence, and the scrambled data is descrambled by performing a logical operation to the random number sequence.

In yet another embodiment of the invention, the data recording area is divided into a plurality of sectors. Each of the plurality of sectors includes a sector header field where information for identifying the sector is recorded and a main data field where the scrambled data is recorded. Information for identifying use of the information recording medium is recorded in the sector header field.

According to another aspect of the invention, an information reproducing device includes a reading circuit for reading scrambled data and key information to be used for descrambling the scrambled data from an information recording medium; and an authentication circuit for authenticating to transmit information corresponding to the key information to the decoding device before transmitting the scrambled data to the decoding device including a descramble circuit for descrambling the scrambled data.

In one embodiment of the invention, the information recording medium includes a lead-in area and a data recording area. Key information includes first key information recorded in the lead-in area and second key information recorded in the data recording area.

According to another aspect of the invention, an information reproducing device includes an authentication circuit for authenticating key information from a reading device before receiving scrambled data from the reading device for reading the scrambled data and the key information to be used for descrambling the scrambled data from an information recording medium; and a descramble circuit for descrambling the scrambled data received from the reading device.

In one embodiment of the invention, the information recording medium includes a lead-in area and a data recording area. The key information includes first key information recorded in the lead-in area and second key information recorded in the data recording area.

In another embodiment of the invention, the descramble circuit descrambles the scrambled data based on information obtained by converting the second key information based on the first key information.

According to another aspect of the invention, an information reproducing device includes a reading circuit for reading scrambled data and key information to be used for descrambling the scrambled data from an information recording medium; a decoding section including a descramble circuit for descrambling the scrambled data; and an authentication circuit for authenticating to transmit information corresponding to the key information to the decoding section before transmitting the scrambled data to the decoding section.

In one embodiment of the invention, the information recording medium includes a lead-in area and a data recording area. The key information includes first key information recorded in the lead-in area and second key information recorded in the data recording area.

In another embodiment of the invention, the descramble circuit descrambles the scrambled data based on information obtained by converting the second key information based on the first key information.

In still another embodiment of the invention, a scramble flag for indicating whether or not data recorded in the data recording area is scrambled is further recorded in the information recording medium. The information reproducing device further includes a control circuit for controlling whether or not the authentication circuit is to be activated depending on the scramble flag.

In yet another embodiment of the invention, authentication by the authentication circuit is performed by using a predetermined function.

In another embodiment of the invention, authentication by the authentication circuit is performed by using information changing over time.

In still another embodiment of the invention, the authentication circuit generates bus key information in the case where authentication processing is normally ended, and encrypts the first key information and the second key information using the bus key information.

In yet another embodiment of the invention, the authentication circuit decrypts the encrypted first key information and the encrypted second key information encrypted using the bus key information.

According to another aspect of the invention, an information reproduction method for reproducing scrambled data using a reading device for reading scrambled data and the key information to be used for descrambling the scrambled data from an information recording medium and a decoding device including a descramble circuit for descrambling the scrambled data includes the steps of performing mutual authentication processing between the reading device and the decoding device; generating bus key information common to the reading device and the decoding device in the case where the mutual authentication processing is normally ended between the reading device and the decoding device; encrypting the key information in accordance with the bus key information; and transmitting the encrypted key information from the reading device to the decoding device.

BRIEF DESCRIPTION OF THE DRAWINGS

FIG. 1 is a view showing a data structure of an information recording medium according to the present invention.

Portions (a) and (b) of FIG. 2 are views showing the structure of scramble information recorded in a lead-in area of the information recording medium shown in FIG. 1.

Figure 3:
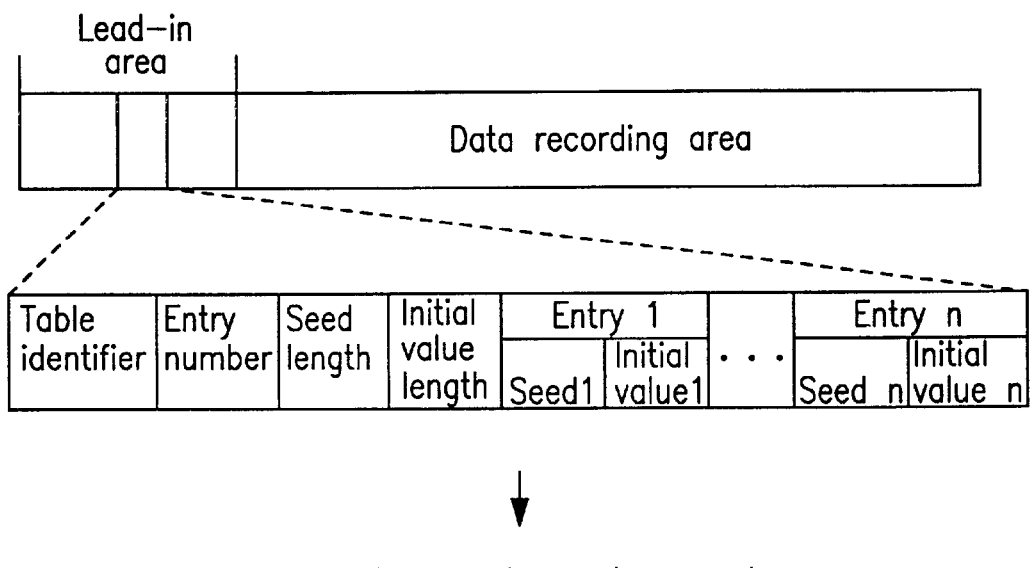

FIG. 3 is a view showing another data structure of an information recording medium according to the present invention.

Figure 4:
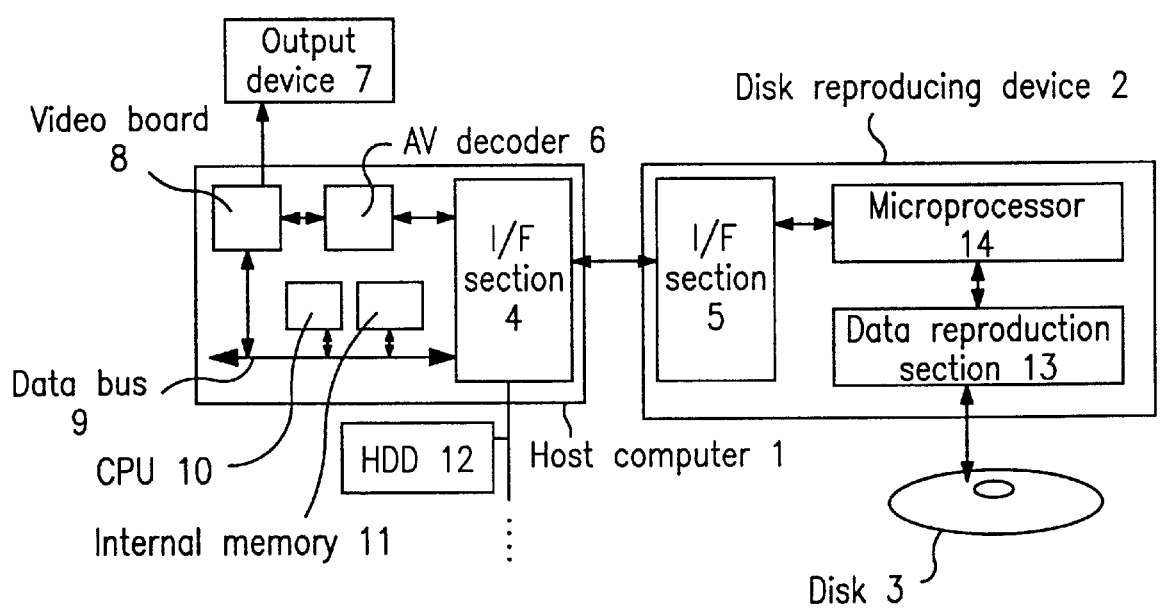

FIG. 4 is a block diagram showing a structure of an information reproducing device according to the present invention.

Figure 5:
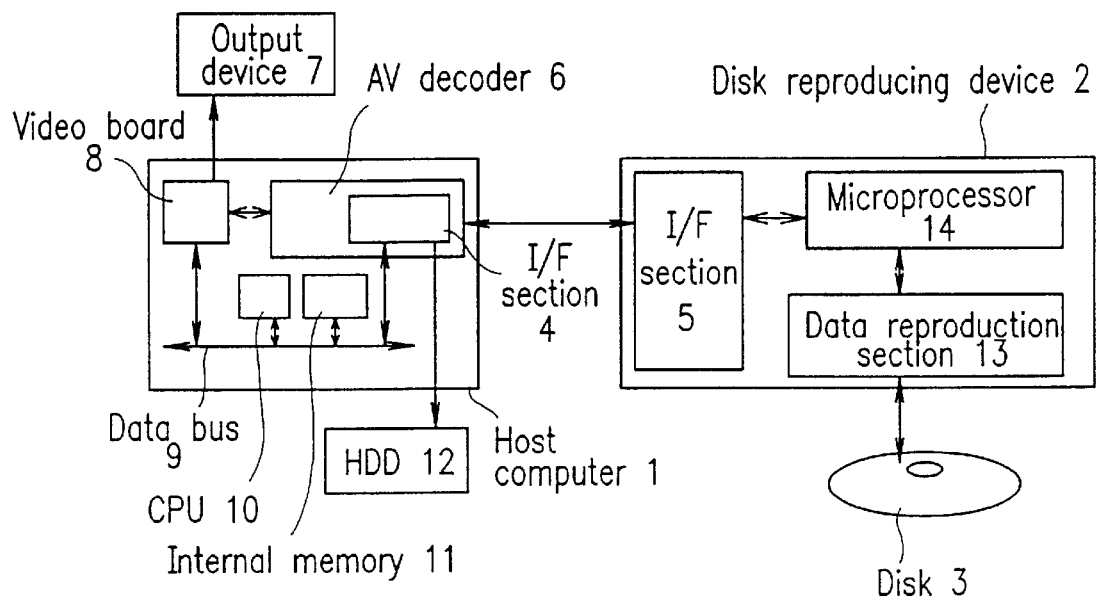

FIG. 5 is a block diagram showing another structure of an information reproducing device according to the present invention.

Figure 6:
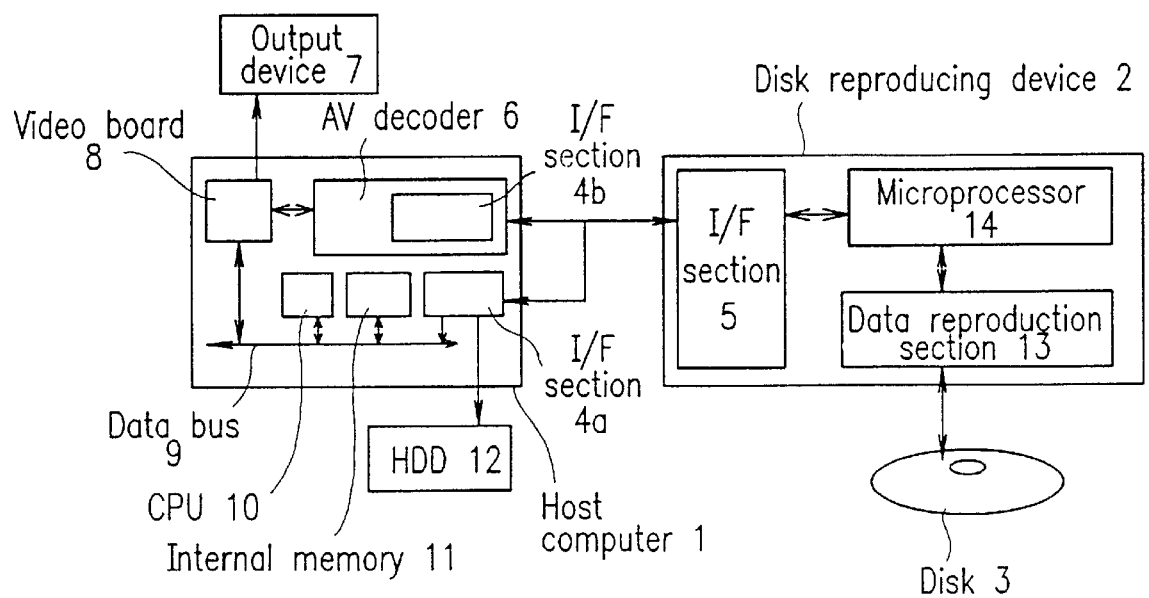

FIG. 6 is a block diagram showing still another structure of an information reproducing device according to the present invention.

Figure 7:
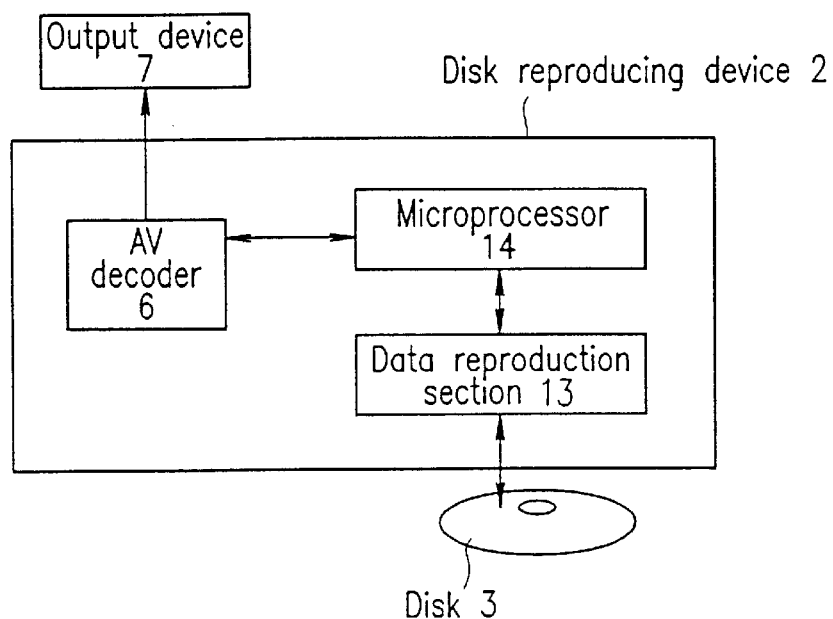

FIG. 7 is a block diagram showing yet another structure of an information reproducing device according to the present invention.

Figure 8:
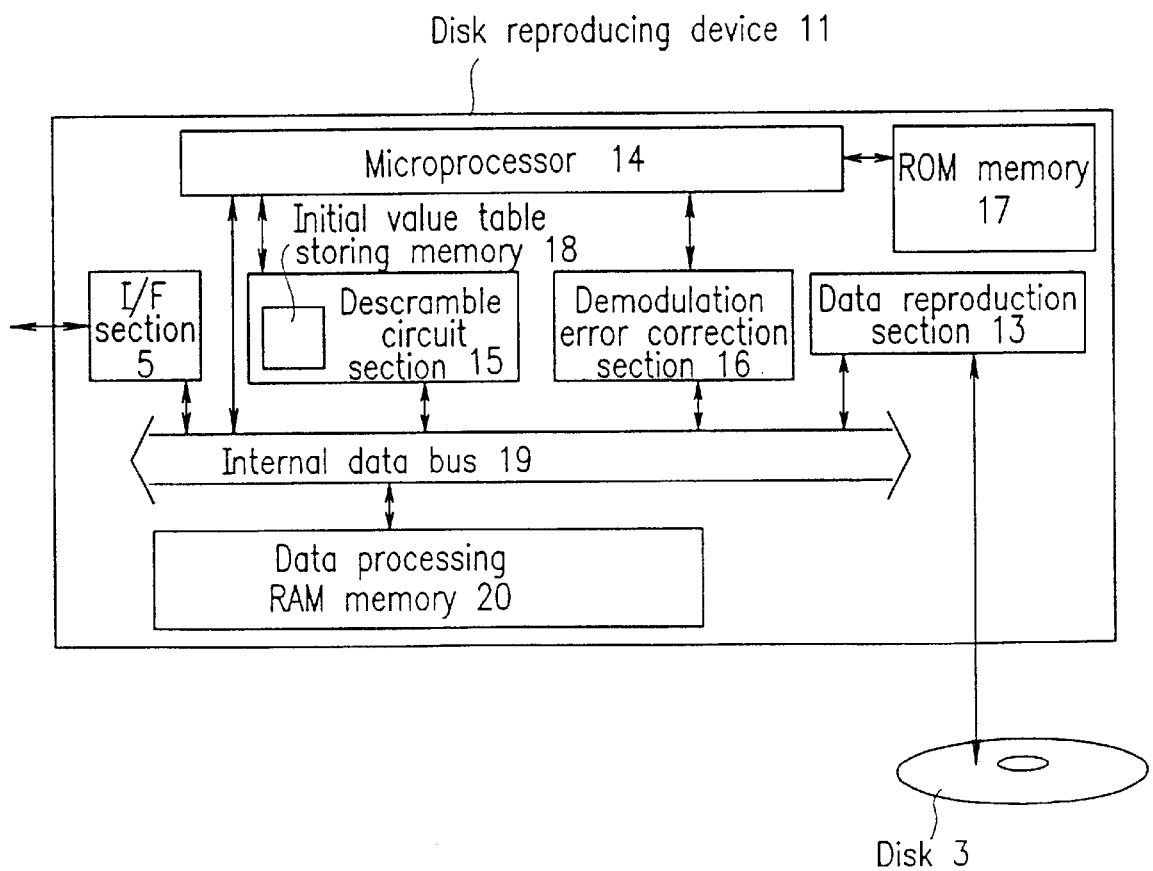

FIG. 8 is a block diagram showing another structure of an information reproducing device according to the present invention.

Portions (a) to (c) of FIG. 9 are views showing an exemplary scramble-processing method.

Figure 10:
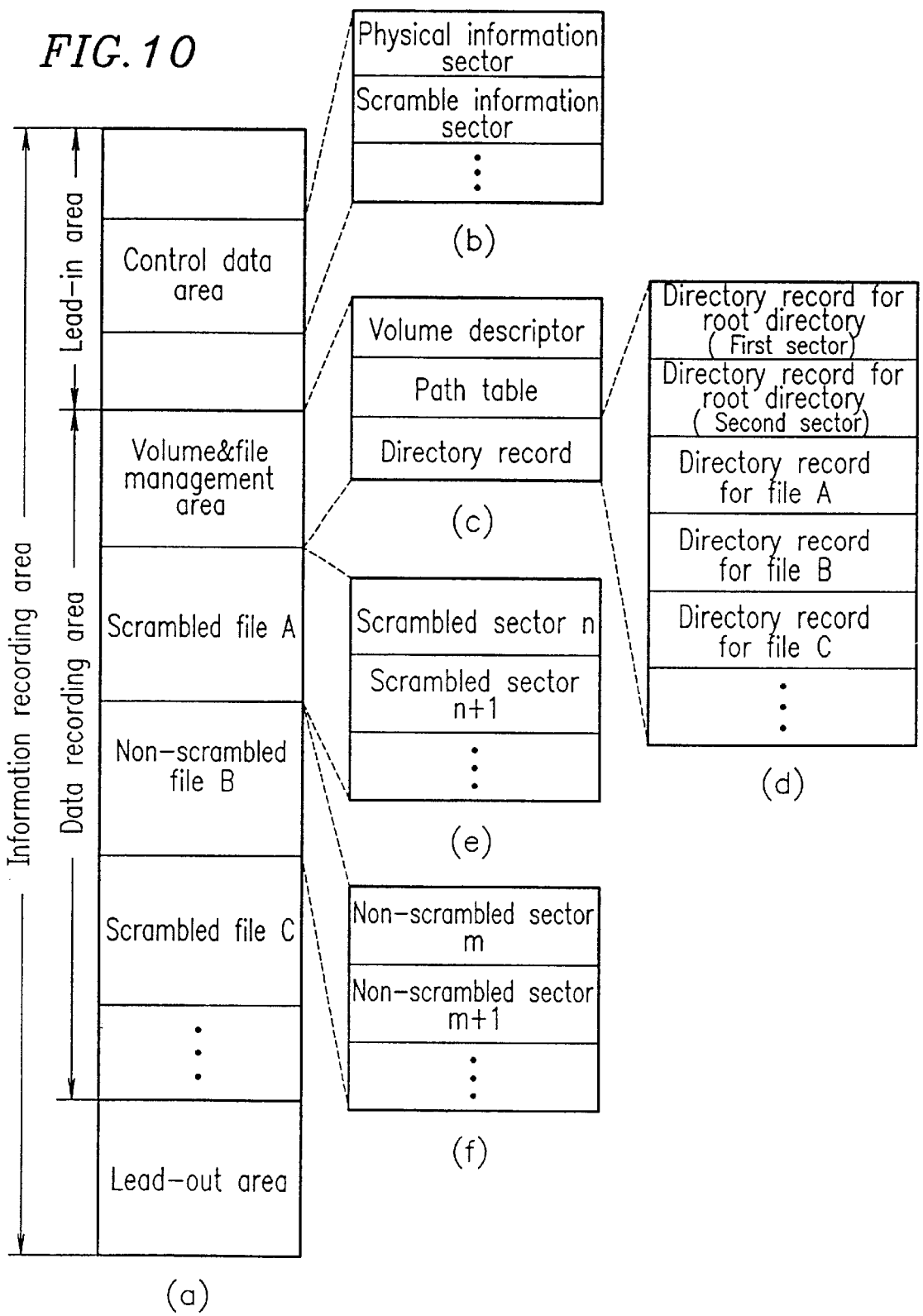

Portions (a) to (f) of FIG. 10 are views showing a data structure of an information recording medium according to the present invention.

Figure 11:
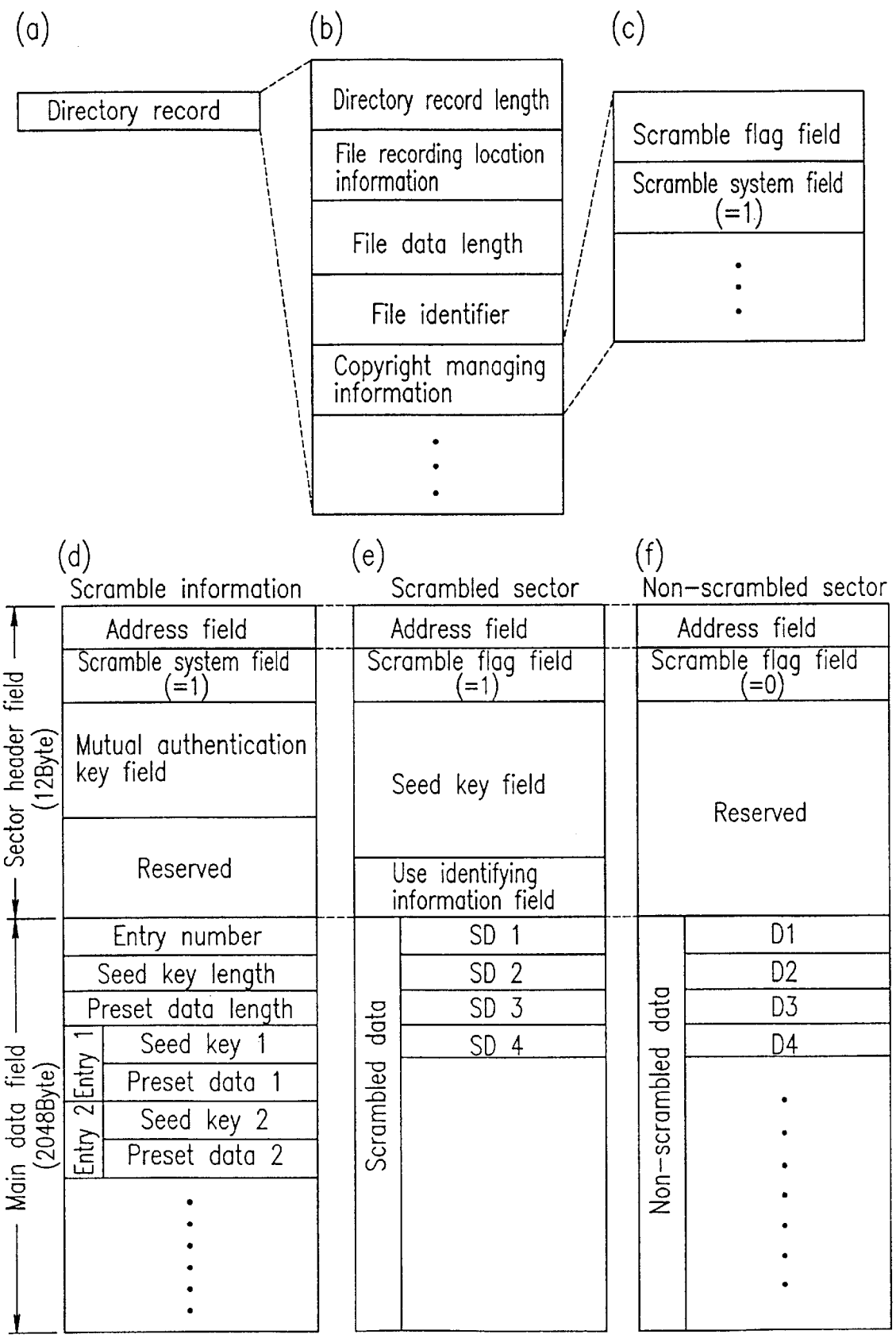

Portions (a) to (c) of FIG. 11 are views showing a data structure of a directory recording in a volume-file management area.

Portion (d) of FIG. 11 is a view showing a data structure of a scramble information sector.

Portion (e) of FIG. 11 is a view showing a data structure of a scrambled sector.

Portion (f) of FIG. 11 is a view showing a data structure of a non-scramble information sector.

Portions (a) to (c) of FIG. 12 are views showing an exemplary scramble system.

Figure 13:
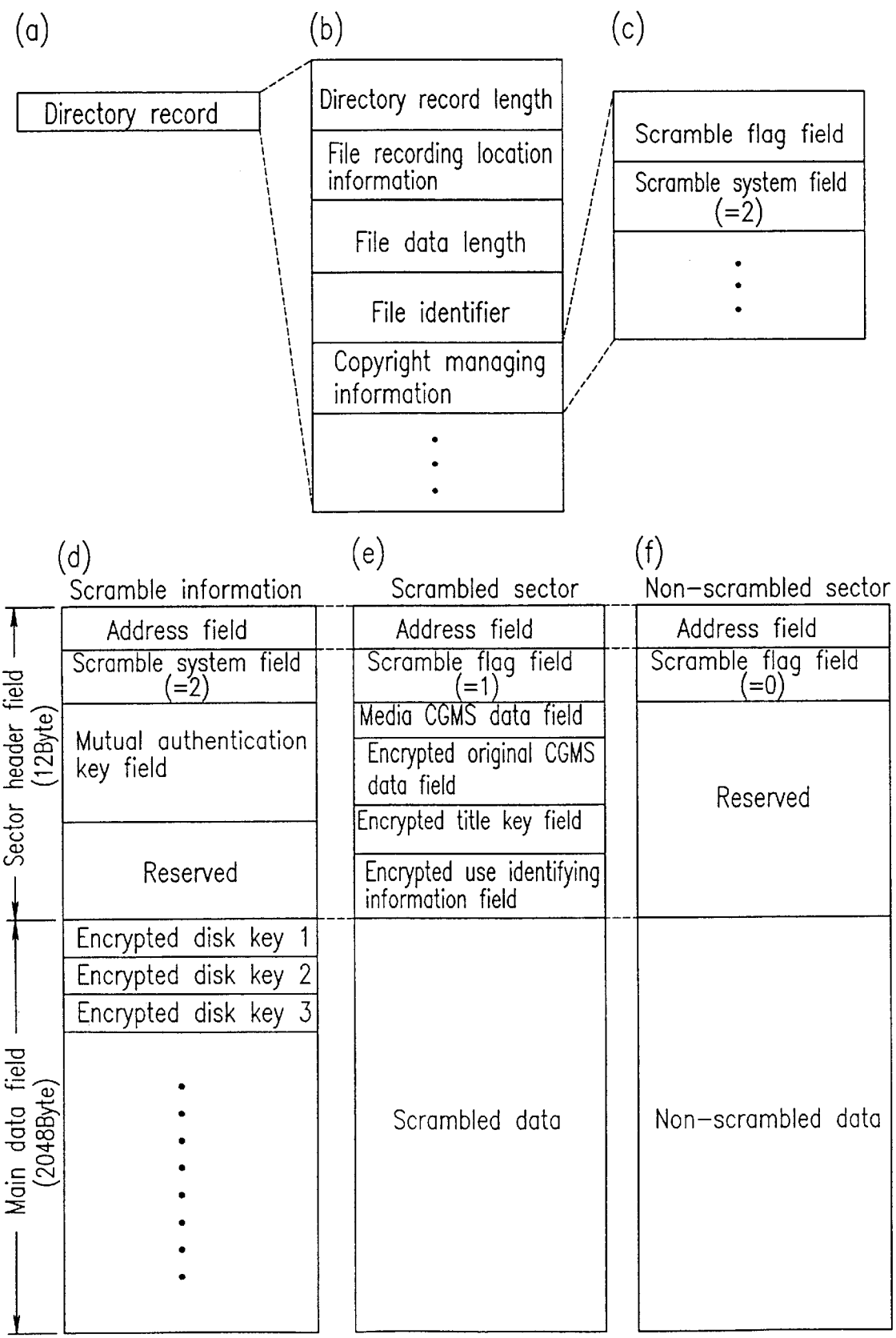

Portions (a) to (c) of FIG. 13 are views showing a data structure of a directory recording in a volume-file management area.

Portion (d) of FIG. 13 is a view showing a data structure of a scramble information sector.

Portion (e) of FIG. 13 is a view showing a data structure of a scrambled sector.

Portion (f) of FIG. 13 is a view showing a data structure of a non-scrambled sector.

Figure 14:
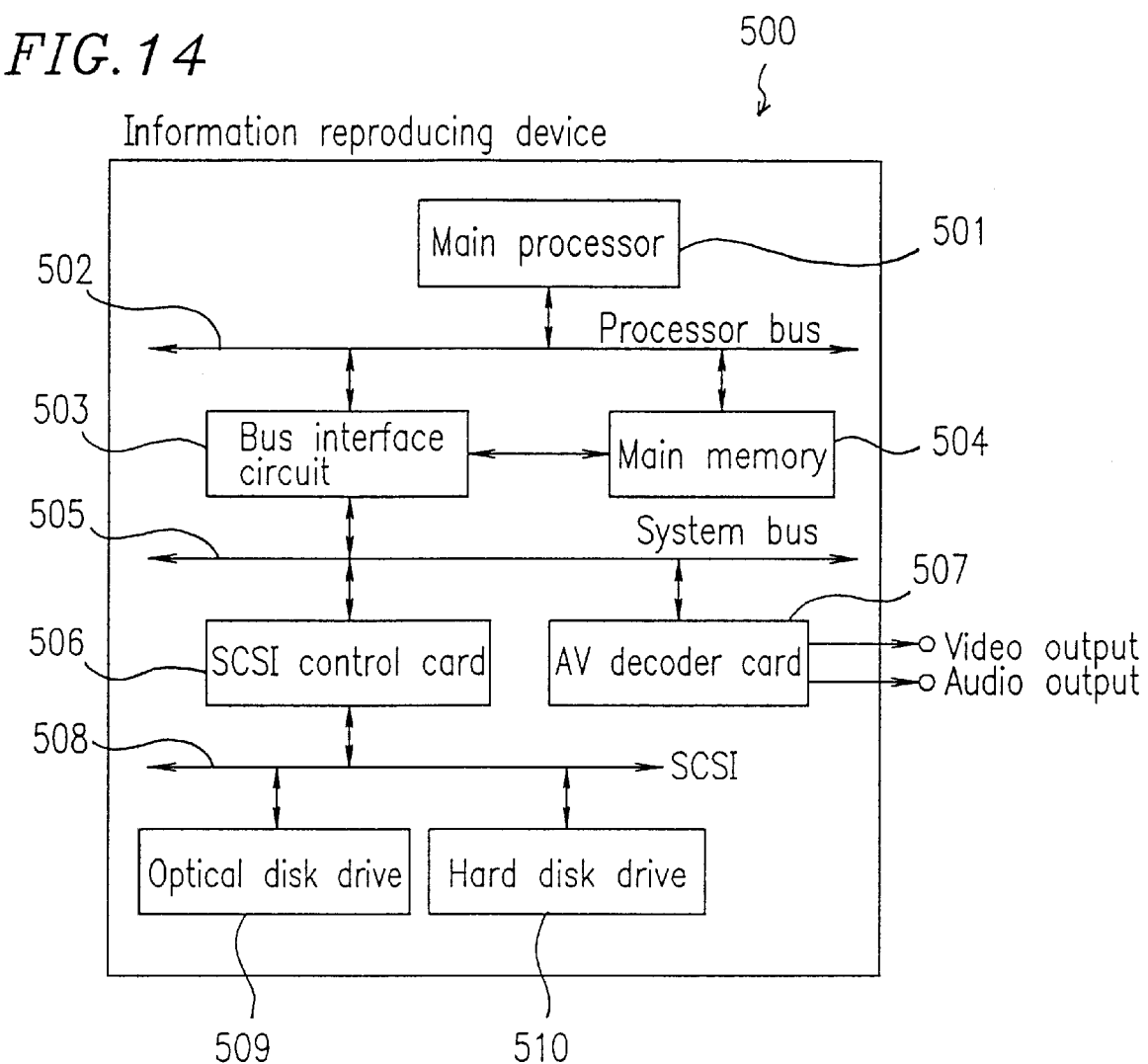

FIG. 14 is a block diagram showing a structure of an information reproducing device 500 according to the present invention.

Figure 15:
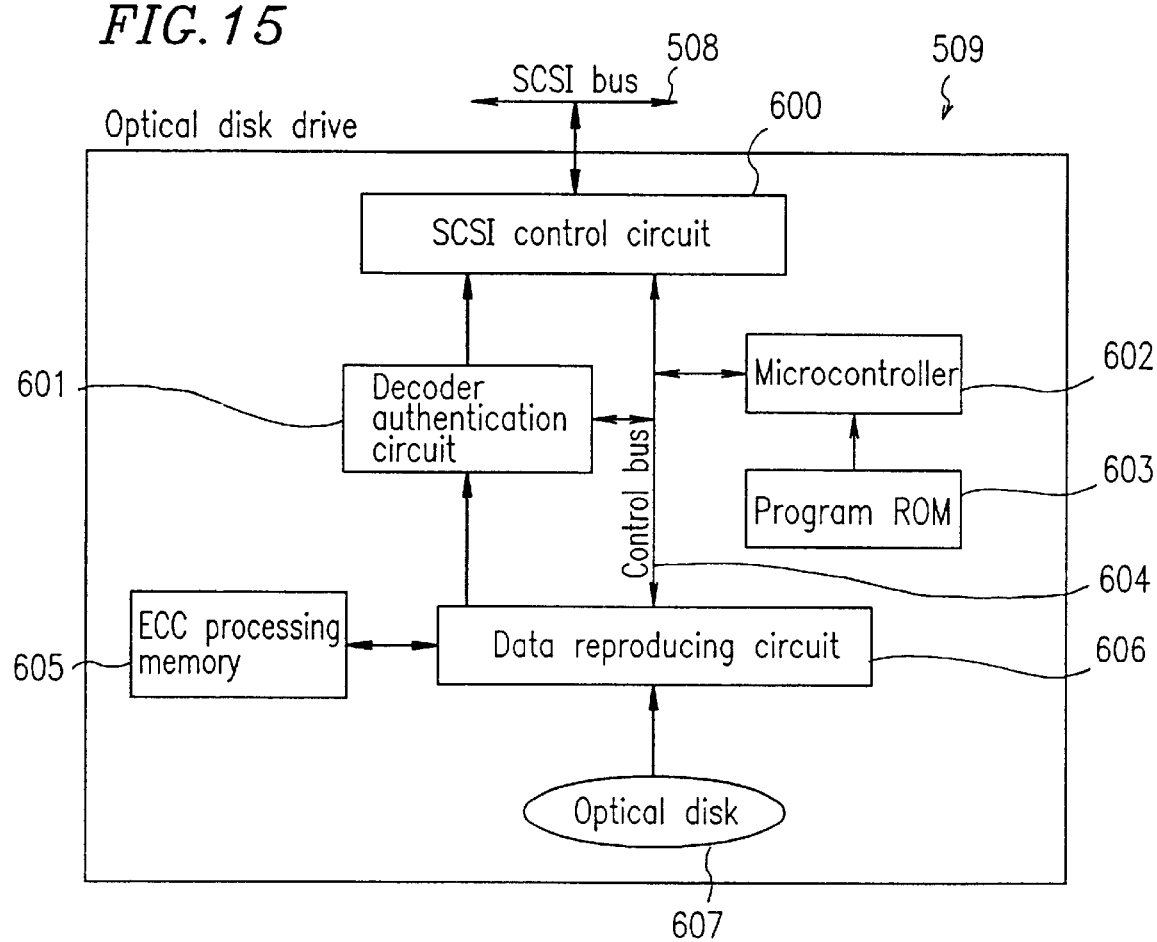

FIG. 15 is a block diagram showing a structure of an optical disk drive 509 included in the information reproducing device 500.

Figure 16:
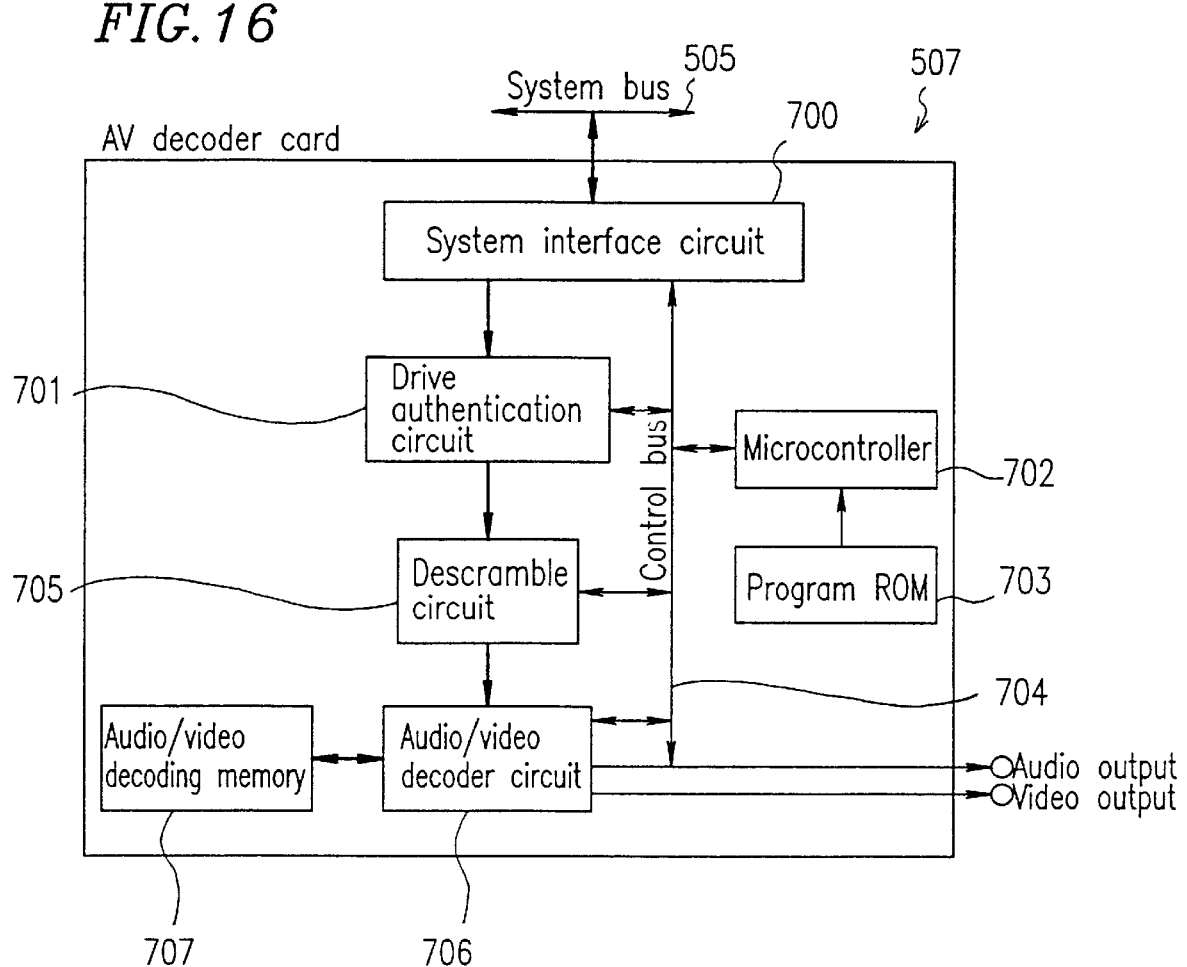

FIG. 16 is a block diagram showing a structure of an AV decoder card 507 included in the information reproducing device 500.

Figure 17:
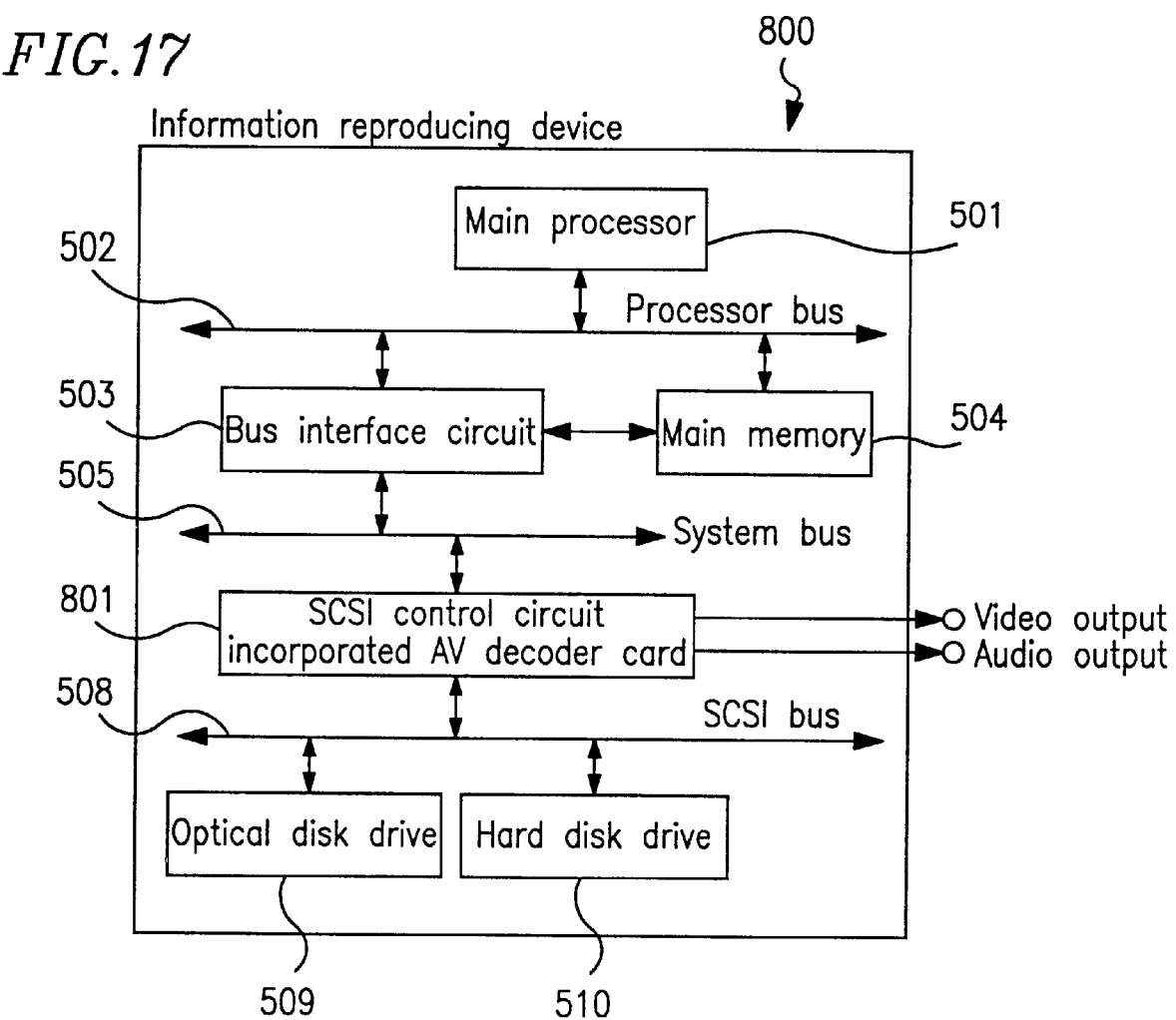

FIG. 17 is a block diagram showing a structure of an information reproducing device 800 according to the present invention.

Figure 18:
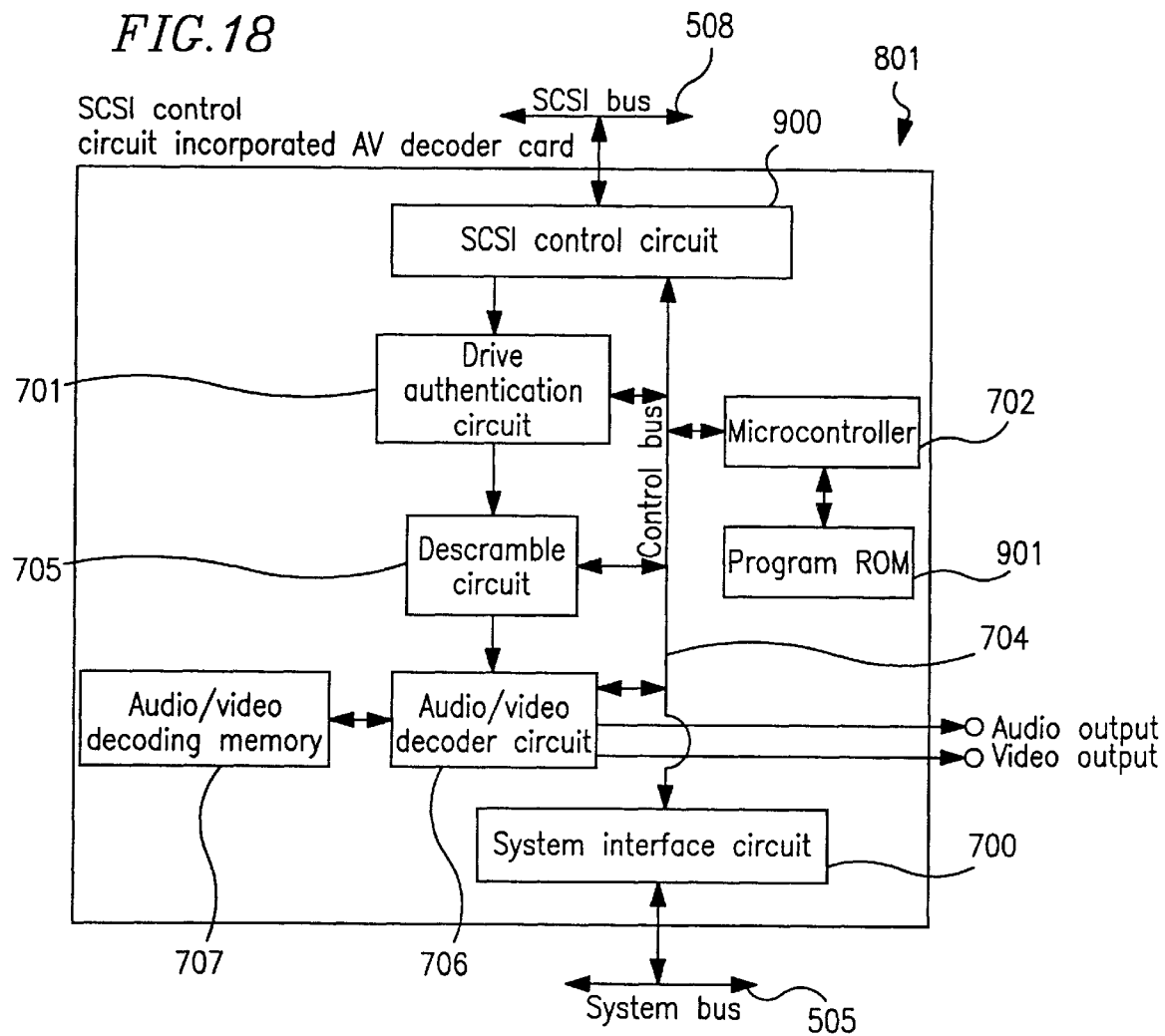

FIG. 18 is a block diagram showing a structure of an SCSI control circuit incorporated AV decoder card 801 included in the information reproducing device 800.

Figure 19:
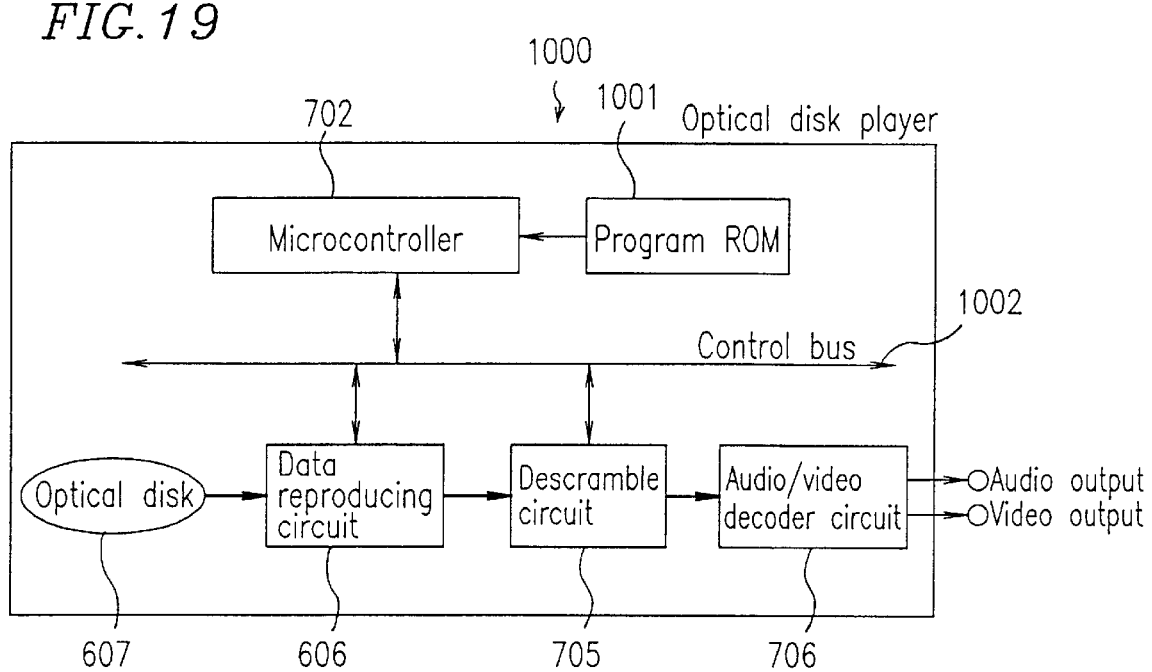

FIG. 19 is a block diagram showing a structure of an information reproducing device (optical disk player) 1000 according to the present invention.

Figure 20:
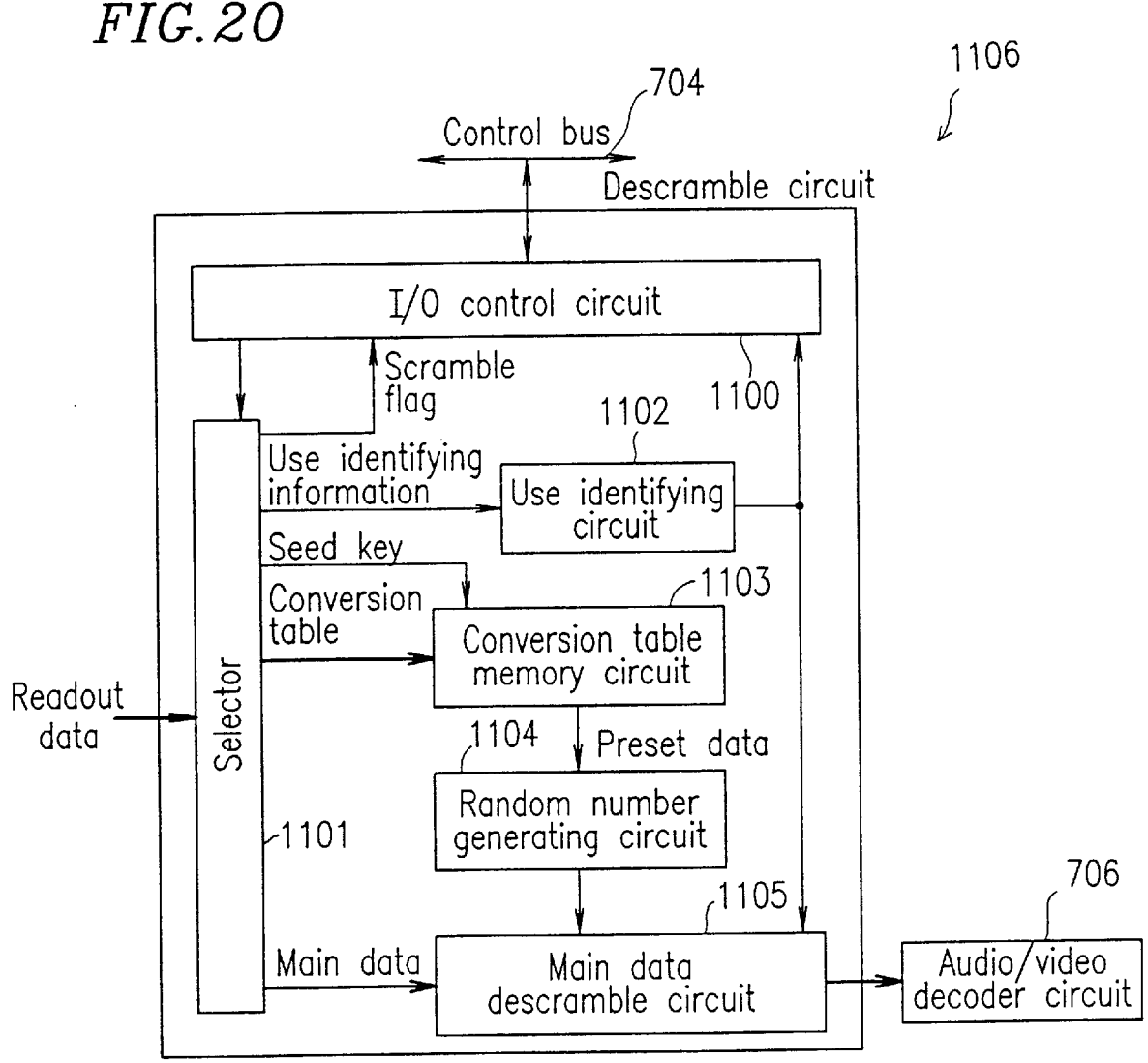

FIG. 20 is a block diagram showing a structure of a descramble circuit 1106.

Figure 21:
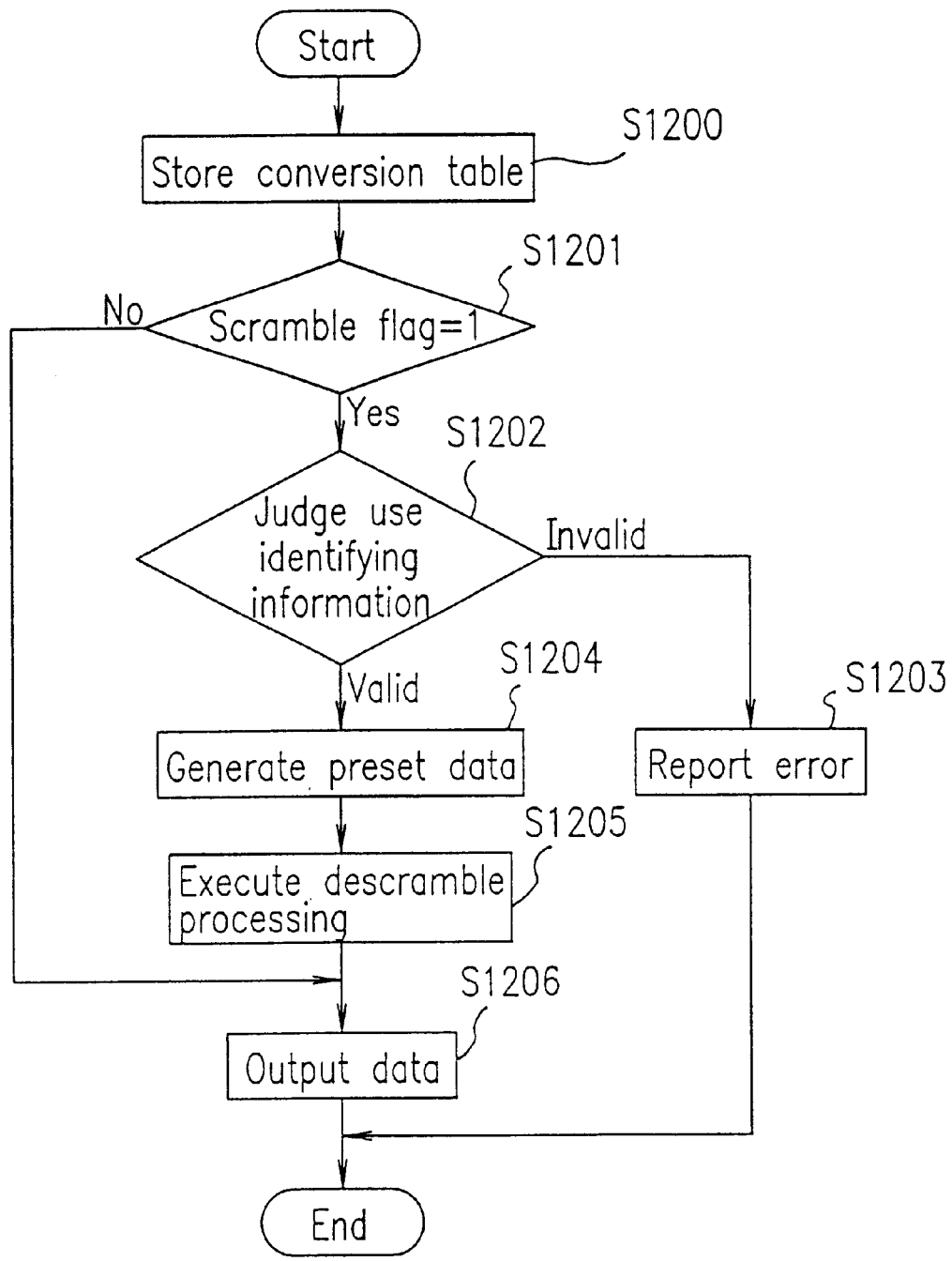

FIG. 21 is a flow chart showing a procedure of a descramble-processing executed by the descramble circuit 1106.

Figure 22:
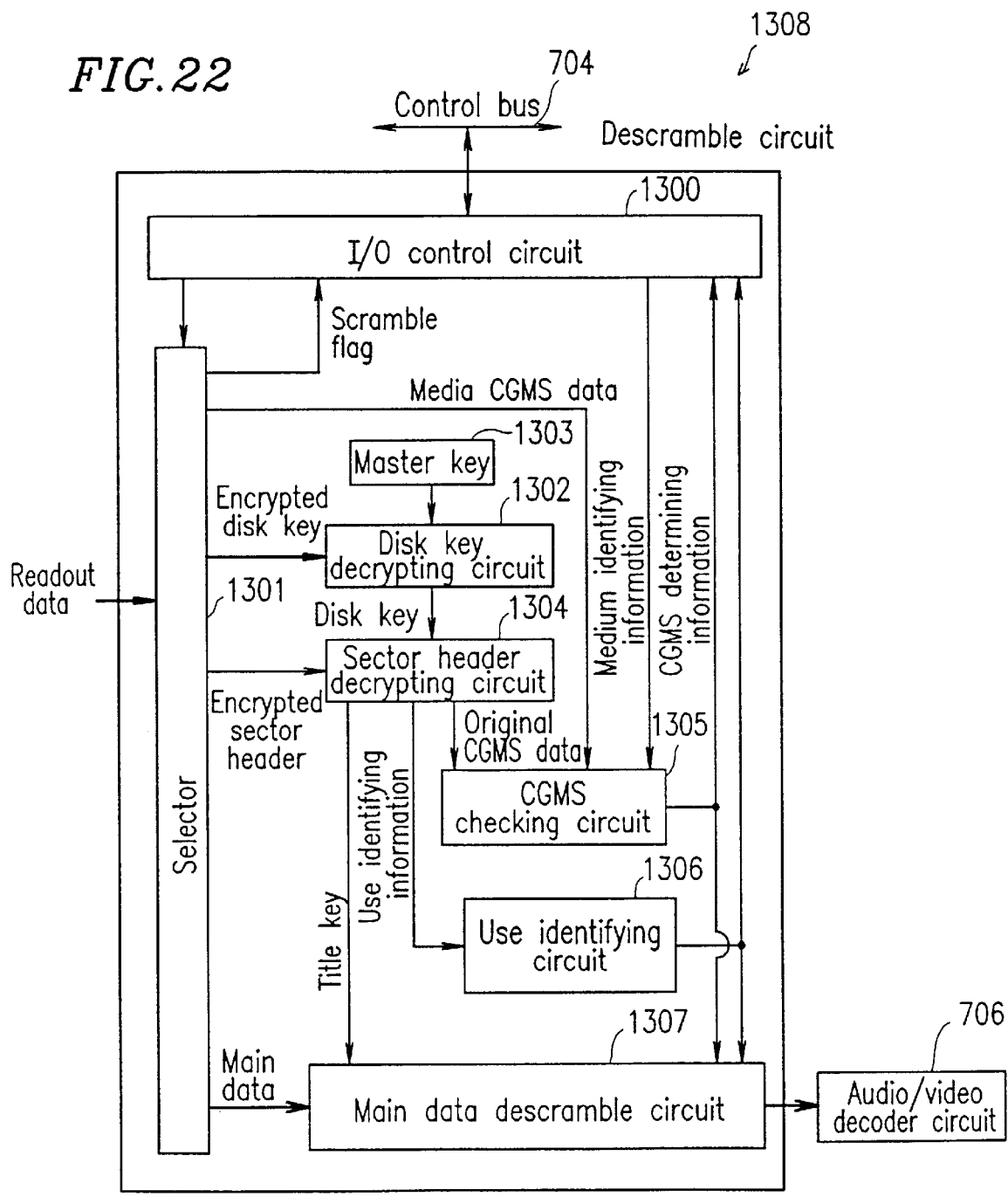

FIG. 22 is a block diagram showing a structure of a descramble circuit 1308.

Figure 23:
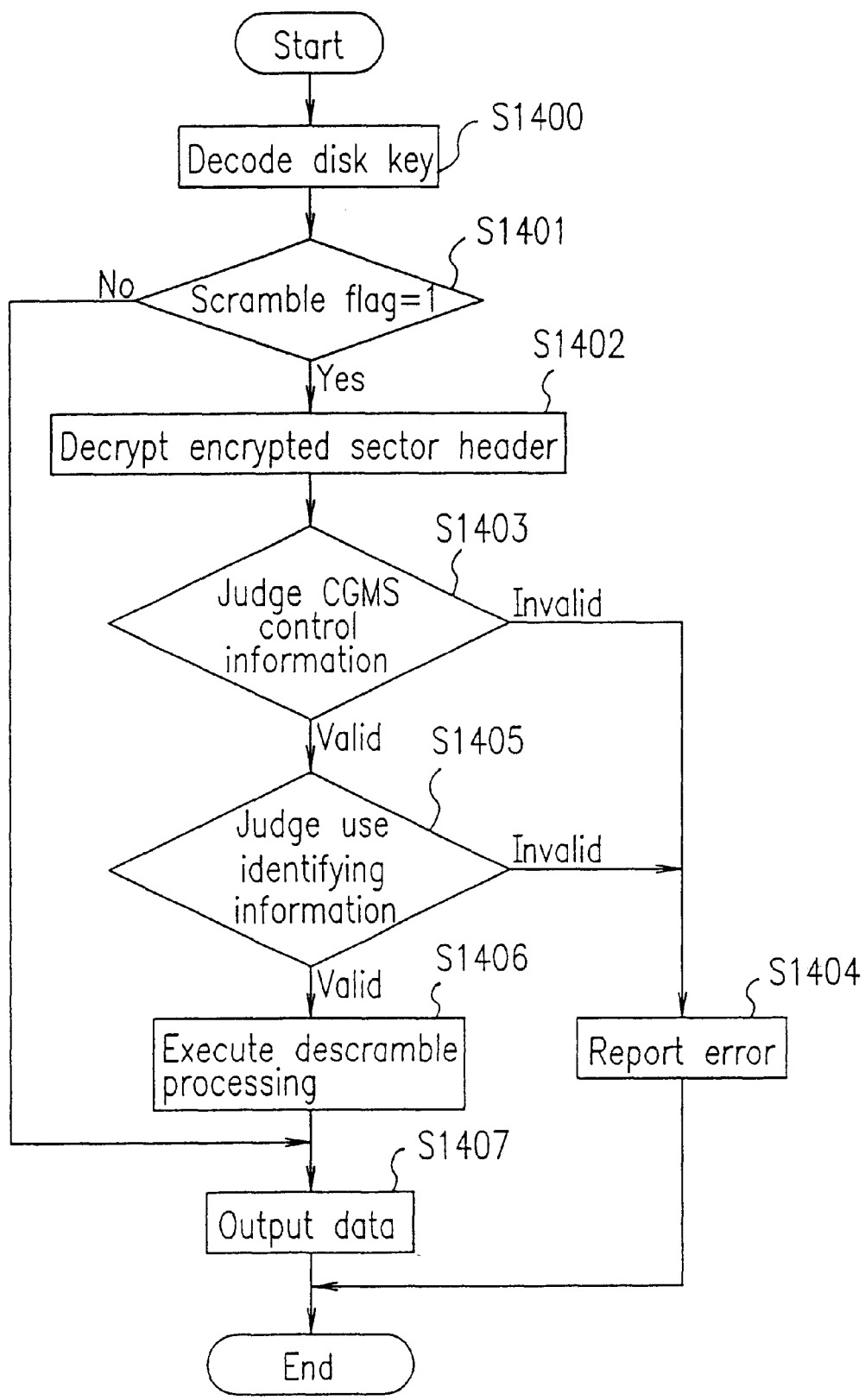

FIG. 23 is a flow chart showing a procedure of a descramble-processing executed by the descramble circuit 1308.

Figure 24:
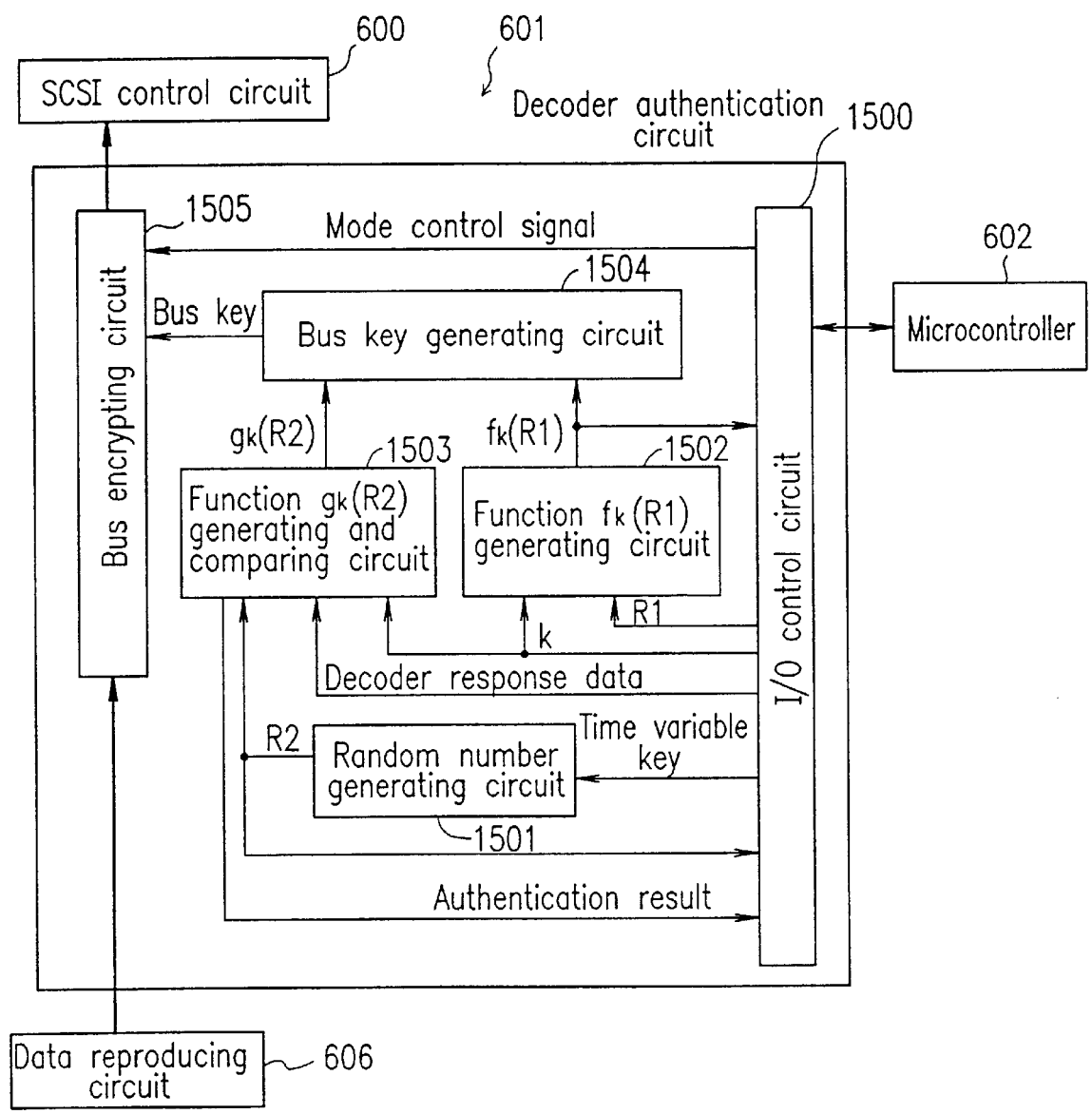

FIG. 24 is a block diagram showing a structure of a decoder authentication circuit 601.

Figure 25:
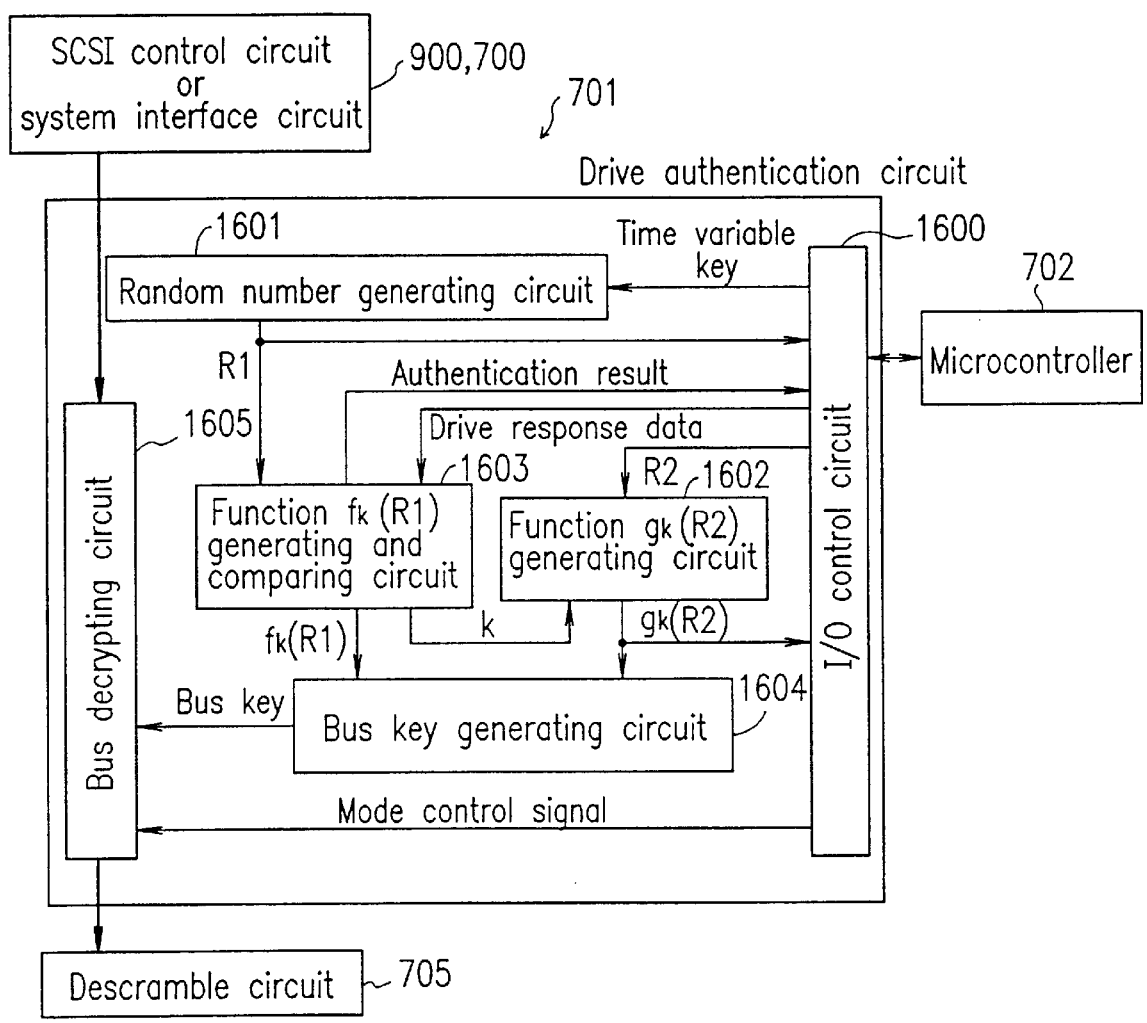

FIG. 25 is a block diagram showing a structure of a drive authentication circuit 701.

Figure 26:
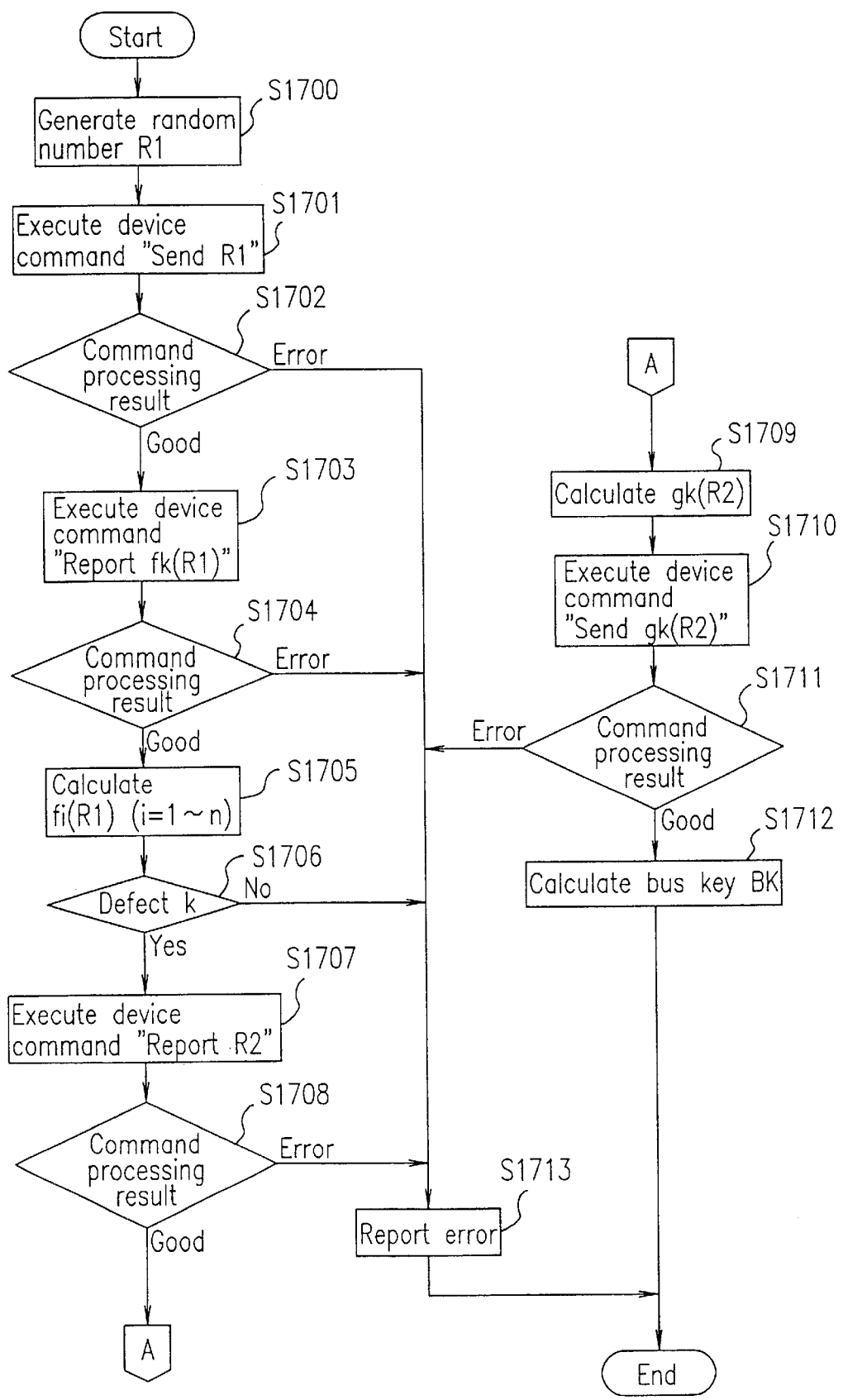

FIG. 26 is a flow chart illustrating mutual authentication processing between the optical disk drive 509 and the AV decoder card 507 or the SCSI control circuit incorporated AV decoder card 801.

BEST MODE FOR CARRYING OUT THE INVENTION

Hereinafter, the present invention will be described by way of embodiments with reference to the accompanying drawings.

(First Embodiment)

FIG. 1 shows a data structure of an information recording medium according to the present invention. Hereinafter, a disk will be described as an example of the information recording medium. However, the information recording medium of the present invention is not limited to the disk, but any information recording mediums.

Generally, information recording areas where some information is recorded on a disk are roughly classified into a lead-in area where control information is mainly recorded and a data recording area where user data is recorded. In addition, the data recording area is generally partitioned into a unit referred to as a sector. Herein, a disk reproducing device can directly access the lead-in area, but devices other than the disk reproducing device (e.g., a personal computer) cannot access the lead-in area.

Each sector includes a sector header field where a sector ID (Identifier) for identifying the sector or the like is recorded, a user data field where user data is recorded, and an ECC (Error Correction Code) field where a code for correcting readout errors at the time of reproduction is recorded. A "sector header field" is a field where control information used by a reproduction apparatus is recorded, and it is difficult to directly read the field by an external unit, such as, a PC. In this embodiment, the user data recorded in the user data field in the sector is subjected to scramble-processing. Therefore, it is necessary to identify the scramble-processing method which is performed with respect to the user data in order for the information reproducing device to correctly reproduce the user data from the disk shown in FIG. 1.

In a predetermined location in the lead-in area of the disk in FIG. 1, information which determines a scramble-processing method which is performed with respect to the user data (hereinafter, referred to as "scramble information" in this specification) is recorded. The information reproducing device reads the area where the scramble information is recorded, interprets the scramble information and performs descramble-processing in accordance with the scramble information with respect to the user data. Thus, it is possible to correctly reproduce the user data.

Hereinafter, an example of a scramble-processing method which is generally known will be described with reference to FIG. 9.

Portion (a) of FIG. 9 shows that one sector consists of a sector header field (where a sector ID for identifying the sector is included), a user data field of 2048 bytes and an ECC field. A data byte sequence $D_0, D_1, \ldots$ and $D_{2047}$ is recorded in the user data field. The data byte sequence $D_0, D_1, \ldots$ and $D_{2047}$ is obtained by a logical operation of a data byte sequence $D'_0, D'_1, \ldots$ and $D'_{2047}$ to be recorded (before scramble-processing) and a random number sequence $S_0, S_1, \ldots$ and $S_{2047}$. For example, the logical operation can be an exclusive logical sum. The random number sequence $S_0, S_1, \ldots$ and $S_{2047}$ is uniquely determined by a supplied initial value.

It will be understood that throughout this disclosure, the term "random number sequence" is known in the art as a "pseudo-random number sequence".

In order to obtain the random number sequence $S_0, S_1, \ldots$ and $S_{2047}$, based on a predetermined bit string in the sector (e.g., three bits in the predetermined location in the sector ID), a table as shown in portion (b) of FIG. 9 is referred to. For example, in the case where the three bits in the predetermined location in the sector ID are (0, 0, 1), 100Fh is obtained as the initial value according to the table, and the random number sequence $B_0, B_1, \ldots$ and $B_{2047}$ (corresponding to $S_0, S_1, \ldots$ and $S_{2047}$) is uniquely determined.

As a method for generating the random number sequence $S_0, S_1, \ldots$ and $S_{2047}$ from the supplied initial value, for example, a method of employing a shift register as shown in portion (c) of FIG. 9 is known.

As a scramble-processing method, it is possible to employ other methods such as a method of replacing a predetermined bit in the byte sequence in the user data. The following description is made by taking the scramble-processing method described with reference to FIG. 9 as an example.

FIG. 2 shows a structure of a scramble information recorded in a predetermined location in the lead-in area in the disk shown in FIG. 1.

As shown in portion (a) of FIG. 2, in this example, the scramble information is an identifier for designating a table for providing an initial value for a random number sequence to be used in scramble-processing. It is assumed that information for specifying the scramble-processing method other than the table is previously defined.

For example, the content of the scramble information of (1, 0) indicates that, among four tables previously defined as shown in portion (b) of FIG. 2, table 2 is used for the scramble-processing. The information reproducing device has a memory storing the four tables shown in portion (b) of FIG. 2, and switches the table to be used for descramble-processing in accordance with the scramble information. Thus, it is possible to correctly execute the descramble-processing with respect to the user data.

FIG. 3 shows another data structure of the disk according to the present invention. An initial value table is directly recorded in the lead-in area in the disk shown in FIG. 3. The user data which is subjected to scramble-processing with the random number sequence generated by using the initial value table is recorded in the data recording area in the disk. Herein, it is assumed that other parameters which the scramble-processing method shown in FIG. 3 has are uniquely determined in advance.

The information reproducing device reads the initial value table recorded in the lead-in area in the disk, and interprets the initial value table. Thereafter, the information reproducing device sets a descramble-processing procedure in accordance with the initial value table, and descrambles the user data in accordance with the descramble-processing procedure. Thus, it is possible to correctly reproduce the scrambled user data.

Furthermore, the disk can be reproduced by an information reproducing device which only has a specific descramble-processing procedure, only in the case where the initial value table of the disk is matched with that of the information reproducing device. It is impossible to correctly reproduce in other cases than that.

The embodiment described above has demonstrated a method of changing the initial value table of the random number sequence in the scramble-processing method shown in FIG. 9. However, the scramble-processing method shown in FIG. 9 is not necessarily used, and a totally different scramble-processing method can be used. Furthermore, in the scramble-processing method shown in FIG. 9, a variety of parameters which can be changed exist, other than the initial value table (e.g., how to select a bit string for reference to the initial value table and a structure of a shift register for generating random numbers or the like). Thus, it is possible to supply an identifier to each of the changeable parameters and a combination thereof.

As described above, according to the information recording medium of the present invention, it is possible to change the scramble-processing method depending on the use and whether or not copying is permitted. As a result, illegal reproduction (e.g., reproduction of an industrial disk by a consumer disk reproducing device) and illegal copying can be prevented.

(Second Embodiment)

FIG. 4 shows a structure of an information reproducing device according to the present invention. The information reproducing device includes a host computer 1 and a disk reproducing device 2 for reproducing data recorded in a disk 3.

The host computer 1 includes an interface section (I/F section) 4, an AV decoder 6 for decoding video information so as to have a form in which the video information can be displayed, a video board 8 for supplying the video information to a display device 7, a CPU 10 and an internal memory 11 such as a DRAM (Dynamic Random Access Memory). The video board 8, the CPU 10 and the internal memory 11 are interconnected via a data bus 9. The output of the video board 8 is connected to the display device (output device) 7. A hard disk drive 12 is connected to the interface section 4.

A disk reproducing device 2 includes an interface section 5; a data reproduction section 13 including a mechanism for reading data from a disk 3, a signal processing circuit, a controller and the like; and a microprocessor 14 for controlling the disk reproducing device 2.

The host computer 1 and the disk reproducing device 2 are connected via the interface sections 4 and 5. For example, the interface sections 4 and 5 can be connected by an existing interface such as an SCSI (Small Computer System Interface), an ATAPI (At Attachment Packet Interface) or the like, or a specially defined interface for its own.

The disk reproducing device 2 reads scramble information recorded in the lead-in area in the disk 3 at the time of reset of the disk reproducing device 2 and at the time of replacement of the disk 3, interprets the scramble information and sets a descramble-processing procedure in accordance with the scramble information in the data reproduction section 13.

In order to display the user data recorded in the data recording area in the disk 3 in the output device 7, the host computer 1 issues a reproduction only command (hereinafter, referred to as a PLAY AV command) to the disk reproducing device 2 via interface sections 4 and 5. In response to the PLAY AV command, the disk reproducing device 2 transmits the user data which is subjected to the descramble-processing in accordance with the scramble information to the host computer 1.

The interface section 4 of the host computer 1 does not transmit the user data received from the disk reproducing device 2 by using the PLAY AV command to the data bus 9, but only transmits to the AV decoder 6. Therefore, it is impossible to record the user data obtained by using the PLAY AV command in a rewritable medium such as the hard disk drive 12 connected to the host computer 1.

The host computer 1 issues a data readout command (hereinafter, referred to as READ command) in the case where it is necessary to record the user data recorded in the data recording area in the disk 3 to the hard disk drive 12 and the internal memory 11. In response to the READ command, the disk reproducing device 2 determines whether or not copying of the disk 3 is permitted, based on previously retained scramble information. The disk reproducing device 2 behaves differently depending on whether or not the scramble system specified by the scramble information is a type whose copying is permitted.

In the case where the disk reproducing device 2 determines that copying of the disk 3 is permitted, correct user data which has been subjected to the descramble-processing in accordance with the scramble information read from the lead-in area in the disk 3, at the time of the start-up operation of the disk reproducing device 2, is transmitted to the host computer 1. On the other hand, in the case where the disk reproducing device 2 determines that the copying of the disk 3 is prohibited, erroneous user data which has been subjected to descramble-processing inconsistent with the scramble information is transmitted to the host computer 1. Alternatively, it is possible to prevent the disk reproducing device 2 from transmitting back correct data to the host computer 1 by conducting an error processing or the like. Thus, illegal copying can be prevented.

There are a variety of methods for obtaining information whether or not copying of the disk 3 is permitted (hereinafter, referred to as copy permission information). For example, in the case where the copy permission information is recorded in a predetermined area in the disk 3, the disk reproducing device 2 can read the copy permission information from the predetermined area in the disk 3. Alternatively, in the case where the scramble-processing system is limited, depending on the copy permission information, the copy permission information can be specified by the read scramble information.

Alternatively, the copy permission information can be represented by a part of the scramble information. For example, in the case where the scramble information consists of a plurality of bits, it is possible to allow one bit of the plurality of bits to represent the copy permission information. Thus, the scramble information can be used in order to definitively differentiate the scramble system for data which is permitted to be copied from the scramble system for data which is prohibited from being copied. Therefore, by reading the scramble information from the disk 3, it is possible to determine whether or not copying is permitted. In the following description, copy permission information is represented by a part of the scramble information.

FIG. 5 shows another structure of an information reproducing device according to the present invention. In the information reproducing device in FIG. 5, the AV decoder 6 and the interface section 4 which are independent from each other in the host computer 1 in FIG. 4 are integrated. The structure of other components is the same as that of the information reproducing device in FIG. 4.

When a PLAY AV command is issued from the host computer 1, the user data having been subjected to the descramble-processing in accordance with the scramble information is transmitted from the disk reproducing device 2 to the host computer 1. The user data is AV-decoded by the AV decoder 6, and then directly input to the video board 8. Other operations are the same as those in the information reproducing device in the embodiment described with reference to FIG. 4.

FIG. 6 shows another structure of the information reproducing device according to the present invention The information reproducing device in FIG. 6 includes an interface section 4b integrated with an AV decoder 6 and an interface section 4a which is independent of the interface section 4b. The structure of other components is the same as that of the information reproducing device in FIG. 5.

A PLAY AV command is only issued from the interface section 4b in the AV decoder 6. On the other hand, a READ command is issued from the interface section 4a independent of the interface section 4b. Since the other operations are the same as those in the information reproducing device in the embodiment described with reference to FIG. 4, the explanation will be omitted.

FIG. 7 shows another structure of the information reproducing device according to the present invention. In the information reproducing device in FIG. 7, an AV decoder 6 for converting the form of data to a form in which the data can be displayed is incorporated into the disk reproducing device 2. Therefore, it is not necessary to connect the disk reproducing device 2 to the host computer 1.

Hereinafter, the operation of the information reproducing device of this structure will be described. In the disk reproducing device 2 in FIG. 7, a microprocessor 14 reads scramble information from the disk shown in FIG. 1, interprets the scramble information and performs descramble-processing to the user data in accordance with the scramble information. The user data having been subjected to the descramble-processing is supplied to the AV decoder 6. The user data is AV-decoded by the AV decoder 6, and outputs to the output device 7. Thus, it is possible to reproduce the user data recorded in the disk 3.

However, in the case where scramble information, which is not preferable to be reproduced by the disk reproducing device 2, is recorded on the disk 3, it is possible for the disk reproducing device 2 not to perform correct reproduction. For example, it is assumed that the disk 3 is an industrial disk for use in Karaoke. In this case, in the case where the disk 3 is mounted on a consumer disk reproducing device, it is possible to prevent the consumer disk reproducing device from performing reproduction of the data recorded in the disk 3. This is because the consumer disk reproducing device can determine from the scramble information recorded in the disk 3 whether or not the scramble-processing method is used for the consumer disk. Thus, by restricting the scramble-processing method which can be used, depending on the use of the disk 3, it is possible for the disk reproducing device 2 to determine whether or not the data recorded in the disk 3 should be reproduced, based on the scramble information.

Furthermore, for a disk reproducing device which can perform only a specific descramble-processing, by producing a disk where data is scrambled by a scramble method not corresponding to the descramble-processing is recorded, it is possible to prevent the disk reproducing device from reproducing data recorded in the disk.

FIG. 8 shows a structure of an information reproducing device according to the present invention. The information reproducing device includes a host computer 1 and a disk reproducing device 11. The host computer 1 is not shown in FIG. 8. The structure of the host computer 1 is the same as those of the host computers 1 in FIGS. 4 to 6.

The disk reproducing device 11 includes an interface section (IF section) 5, a data reproduction section 13 for reading data recorded in the disk 3, a microprocessor 14 for controlling the disk reproducing device 11, a descramble circuit section 15, a demodulation and error correction section 16, a ROM (Read Only Memory) 17 for storing a program which is to be executed by the microprocessor 14 or the like, and a data processing RAM (Random Access Memory) 20. The interface section 5, the data reproduction section 13, the microprocessor 14, the descramble circuit section 15, the demodulation and error correction section 16 and the data processing RAM 20 are interconnected via an internal data bus 19. The descramble circuit section 15 includes an initial value table storing memory 18.

The microprocessor 14 reads the scramble information from the disk 3 at the time of introduction of the power or the replacement of the disk 3, and interprets the scramble information.

In the case where the disk 3 has the data structure shown in FIG. 2, the microprocessor 14 selects one initial value table from a plurality of initial value tables previously stored in the ROM 17 in accordance with the content of the scramble information. The microprocessor 14 allows a selected initial value table to be stored in the initial value table storing memory 18 in the descramble circuit section 15. The initial value table storing memory 18 can be, for example, a RAM. Alternatively, in the case where the initial value table storing memory 18 is a ROM, a plurality of initial value tables can be previously stored in the ROM.

When the host computer 1 issues a PLAY AV command, the PLAY AV command is input to the microprocessor 14 via the interface section 5 in the disk reproducing device 2. In response to the PLAY AV command, the microprocessor 14 instructs the descramble circuit section 15 so as to perform descramble-processing with respect to the scrambled user data. The descramble circuit section 15 performs the descramble-processing in accordance with the initial value table stored in the initial value table storing memory 18. The data having been subjected to the descramble-processing is transmitted to the host computer 1 via the interface section 5. Thus, the data recorded in the disk 3 can be reproduced.

On the other hand, when the host computer 1 issues a READ command, the READ command is input to the microprocessor 14 via the interface section 5 in the disk reproducing device 11. At this time, the microprocessor 14 determines from the scramble information previously read from the disk 3 whether or not copying is permitted in the scramble system. In the case where the microprocessor determines that copying is prohibited, an initial value table different from the initial value table corresponding to the scramble information is set in the descramble circuit section 15. Alternatively, the microprocessor 14 can transmit back an error to the host computer 1 without setting the initial value table in the descramble circuit section 15. Thus, it is possible to prevent data recorded in the disk 3 from being reproduced.

Furthermore, in the case where the microprocessor 14 determines from the scramble information that copying is permitted and in the case where the disk 3 has the data structure shown in FIG. 3, the microprocessor 14 reads an initial value table from the lead-in area in the disk 3, and allows the initial value table to be stored in the initial value table storing memory 18 in the descramble circuit section 15. The initial value table storing memory 18 is rewritable memory (e.g., an RAM). The description of other processings is omitted because they are the same as those in the case where the disk 3 has the data structure shown in FIG. 2.

As described above, according to the information reproducing device of the present invention, it is possible to change the descramble-processing method depending on the scramble information recorded in the information recording medium. Thus, it is possible to correctly reproduce data scrambled by a plurality of kinds of different scramble-processing methods.

Furthermore, according to the information reproducing device of the present invention, it is possible to determine whether or not to reproduce the data recorded in the information recording medium depending on the scramble information recorded in the information recording medium. As a result, illegal copying can be prevented, and thus the copyright of the data recorded in the information recording medium can be protected.

(Third Embodiment)

Portion (a) of FIG. 10 shows a data structure of an information recording medium according to the present invention. The information recording area where some data is recorded on the information recording medium includes a lead-in area, a data recording area and a lead-out area. In the lead-in area, information necessary for the information reproducing device to reproduce the information recording medium is recorded. In the data recording area, primarily, data such as program data useful for the user and AV data is recorded.

Portion (b) of FIG. 10 shows a data structure of a control data area recorded in the lead-in area. The control data area includes a physical information sector and a scramble information sector. In the physical information sector, physical data of the disk such as a disk diameter, a disk structure, a recording density or the like are recorded. In the scramble information sector, information on a scramble system which has been used on the data recorded in the data recording area of the information recording medium or the like is recorded. The scramble information sector is referred to in order for the information reproducing device to perform descramble-processing. The scramble information sector will be described in detail with reference to the accompanying drawings later.

Portion (c) of FIG. 10 shows a data structure of a volume-file management area. In this embodiment, the data structure of the volume-file management area is compliant with International Standard Organization (ISO) 9660. The ISO 9660 is adopted in CD-ROM (Compact Disk-Read Only memory).

The volume-file management area includes a volume descriptor, a path table and a directory record.

In the volume descriptor, the size of the volume space and information on recording location of the path table, information on recording location of the directory record, information on disk production date or the like are recorded. In the path table, a table which allows paths of all directories existing on the information recording medium to correspond to the recording location information is recorded. In the directory record, information on an identifier of each director or file (generally a directory title or a file title), information on recording location of data, the size of the file, properties or the like are recorded.

Portion (d) of FIG. 10 shows a further detailed data structure of the directory record. In a directory record for a root directory, a property and an identifier of the root directory, a production date or the like are recorded. Furthermore, in the directory record for the root directory (first sector), information on recording location of the directory is recorded. In the directory record for the root directory (second sector), similar information is recorded. In addition, in a directory record for file A, information on recording location of data of file A, a data length, information on the identifier for the file, a copyright managing identifier or the like are recorded. Thus, the plurality of directories form a hierarchy. The root directory is a directory located on the top of the hierarchy. This will be described in detail with reference to the accompanying drawings later.

In the data recording area, a file which is scrambled and a file which is not scrambled are recorded. For example, scrambled files A and C are scrambled files, and non-scrambled file B is a file which is not scrambled. It is preferable that a file storing AV data whose copyright should be protected is a scrambled file.

Portion (e) of FIG. 10 shows a data structure of the scrambled file A. The file A is partitioned into a plurality of continuous sectors starting from a sector n. Data stored in each of the plurality of sectors is subjected to scramble-processing. Hereinafter, in this specification, the sector storing data having been subjected to the scramble-processing is referred to as "a scrambled sector".

Portion (f) of FIG. 10 shows a data structure of the non-scrambled file B. The file B is partitioned into a plurality of continuous sectors starting from a sector m. Data stored in each of the plurality of sectors is not subjected to the scramble-processing. Hereinafter, in this specification, the sector storing data not subjected to the scramble-processing is referred to as "a non-scrambled sector".

Portions (a) to (c) of FIG. 11 show a data structure of the directory record in the volume-file management area. The directory record includes a directory record length, file recording location information, a file data length, a file identifier and copyright managing information.

The directory record length is information showing the size of the directory record of the file (or directory). The file recording location information is information showing a location from which the sector having data of the file recorded (hereinafter, referred to as an extent) starts. The file data length is information showing the number of sectors constituting the file. The file identifier is identification information for identifying the file (file title). The copyright managing information is information regarding the copyright management of the file.

The copyright managing information includes a scramble flag field and a scramble system field. In the scramble flag field is recorded a flag for indicating whether or not data in the file has been subjected to the scramble-processing. In the case where data in the file has been subjected to the scramble-processing, a flag having value 1 is recorded in the scramble flag field. In the case where data in the file has not been subjected to the scramble-processing, a flag having value 0 is recorded in the scramble flag field. Therefore, by referring to the scramble flag field, it can be determined whether or not the data in the file has been subjected to the scramble-processing. In the scramble system field is recorded an identifier for indicating a system of the scramble-processing which has been performed to the data in the file. Therefore, by referring to the scramble system field, the scramble-processing which has been performed to the data can be determined in a unit of file.

Hereinafter, referring to portions (d) to (f) of FIG. 11, an exemplary scramble system will be described. A scramble system identifier corresponding to this scramble system is set as 1.

Portion (d) of FIG. 11 shows a data structure of a scramble information sector recorded in a control data area in a lead-in area. The scramble information sector includes a sector header field and a main data field. A "sector header field" is a field where control information used by a reproduction apparatus is recorded, and it is difficult to directly read the field by an external unit, such as a PC.

The sector header field of the scramble information sector includes an address field where an identifier for the information reproducing device to identify the sector is recorded, a scramble system field where information for specifying the scramble system performed to the information recording area (as described above, the scramble system of this example is set as 1) is recorded, and a mutual authentication key field where a mutual authentication key for use in authentication processing for determining whether or not the information reproducing device should supply data subjected to copyright protection to an apparatus requiring transfer of reproduction data (hereinafter, referred to as mutual authentication processing). The mutual authentication processing will be described in detail later.

In the main data field of the scramble information sector is recorded a table for determining a random number sequence to be used at the time of scramble-processing from a key for scrambling. Therefore, it is not until the information reproducing device uses the table recorded in the scramble information sector and the key for the scrambling that descramble-processing can be performed. Hereinafter, the initial value for determining the random number sequence is referred to as preset data.

Portion (e) of FIG. 11 shows a data structure of a scrambled sector in the data recording area. The sector header field in the scrambled sector includes an address field, a scramble flag field where a flag for identifying whether or not the scramble-processing has been performed to the main data field in the sector, a seed key field where the key used at the time of scrambling (hereinafter, referred to as a seed key) is recorded, and a use identifying information field where information for identifying use of the file is recorded. In the scramble flag field is recorded value 1 indicating that scramble-processing has been performed. In the seed key field is recorded a key to be used for descramble-processing for the main data field. Furthermore, in the use identifying information field is recorded information on the use of the recorded data such as industrial use or consumer use, and is recorded information indicating a reproduction restriction in the case where the use of the information reproducing device is different from the use identifying information. Furthermore, in the main data field is recorded data having been subjected to the scramble-processing determined by a scramble system specified by the scramble information sector in the lead-in area and the seed key in the sector header field in the scrambled sector. More specifically, a preset data is determined based on the value recorded in the seed key field and referring to the table in the scramble information sector. Then, by using the random number sequence determined by the preset data, scrambled/descramble-processing is possible. In the following description, the seed key is the same for every file.

On the other hand, the sector header in the non-scrambled sector includes an address field and a scramble flag field. In the scramble flag field is recorded a value 0 indicating that the scramble-processing has not been performed to the main data field in the sector. Therefore, the information reproducing device can easily recognize that it is unnecessary to perform descramble-processing by detecting the value 0 in the scramble flag field.

Next, referring to FIG. 12, an exemplary scramble system will be described.

Portion (a) of FIG. 12 shows that, by performing a logical operation of data sequence $D_j$ (j is an integer from 0 to 2047) of 8 bits and a random number sequence $S_j$ of 8 bits generated based on a certain initial value, scrambled data $SD_j$ is obtained. More specifically, a preset data of 15 bits determined by the scramble information sector recorded in the lead-in area and the seed key in the sector header field in each sector is set in a shift register 301, and an exclusive OR of the most significant bits $r_{14}$ and $r_{10}$ is put to the bit 0 while shifting to the direction of most significant bits. Thus, the random number sequence $S_j$ is generated. Herein, the bit in the bit location $r_0$ is input to a logical operation block 302 for every one bit shift, and a value of 8 bits input to the logical operation block 302 for eight shifts is set as $S_j$. By the logical operation (e.g., exclusive OR or the like) of $S_j$ obtained in this manner and recorded data of 8 bits, data $SD_j$ after scrambling is obtained. When the size of the main data in one sector is 2048 bytes, scramble-processing in one sector can be performed by repeating the aforementioned procedure 2048 times from $SD_0$ to $SD_{2047}$.

Furthermore, portions (b) and (c) of FIG. 12 show conversion from the scramble information sector to a table for determining preset data. In the scramble information sector shown in portion (b) of FIG. 12, four entries of the table are recorded, and each entry consists of a set of a seed key and preset data. These sets are tabled to obtain the table shown in portion (c) of FIG. 12. For example, when the seed key recorded in the sector header is 01b (b means binary number), 0077h (h means hexadecimal number) as preset data is set in the shift register 301 in portion (a) of FIG. 12 as the initial value, and the aforementioned shift operation and the logical operation are performed. Thus, scramble/descramble-processing becomes possible.

As described above, the information recording medium in this embodiment enables scrambling in a file unit. The information recording medium in this embodiment has information whether or not scrambling has been performed as copyright managing information in the file management area and in the scramble flag field in the sector header in a unit of sector. This enables a device such as a personal computer which only recognizes main data to recognize whether or not scramble-processing has been performed, and enables a device such as an optical disk drive which cannot recognize main data to recognize whether or not scramble-processing has been performed. Therefore, in the case where data is to be reproduced by the optical disk drive connected to the personal computer, it is possible for both of the former and the latter to determine whether or not the copyright of the data should be protected.

Furthermore, since in the information recording medium of this embodiment, different scramble-processing for every file can be performed by changing the seed key, even if a scramble method for one scrambled file is decrypted by an illegal act, another scrambled file can be prevented from being descrambled by the decrypted scramble system. Thus, it is possible to enhance security in processing for copyright protection.

Furthermore, in the case where the information recording medium of this embodiment is used for the purpose of copyright protection, the scramble information sector where scramble information indispensable to descrambling is recorded exists in the lead-in area which cannot be read by an apparatus such as a personal computer. For this reason, the act of illegally reading the scramble information can advantageously be prevented. Furthermore, since the lead-in area is reproducible by the same reproducing means as the data recording area, there is no need for providing a special reproducing means.

Furthermore, since information recorded in a sector such as seed key, scramble flag, use identifying information or the like are recorded in the sector header field and cannot be read by an apparatus such as a personal computer, (as in the case of recording the scramble information in the lead-in area described above), the act of illegally reading the information can advantageously be prevented.

Furthermore, since the use identifying information is recorded in the sector header field, it is possible to determine depending on the content of the recorded data whether the reproducing device should perform reproduction or prohibit reproduction. Therefore, for example, by recording different identifiers between an industrial disk and a consumer disk in this area, the industrial disk can be prevented from being reproduced by a consumer reproducing device.

Furthermore, by recording a mutual authentication key for use in mutual authentication processing, the reproducing device can change data received and transmitted at the mutual authentication operation for every mutual authentication key. Thus, the processing method for the mutual authentication processing can be advantageously prevented from being illegally decrypted. Therefore, it is possible to prevent the act of illegally copying to a magnetic disk drive or the like.

In this embodiment, the volume-file structure is based on ISO9660, which is the international standard, but it is not limited thereto, and another volume-file structure can be used, as long as the volume-file structure has the information described above.

In this embodiment, the scramble system uses the logical operation of random numbers and data, but it is not limited thereto, and another scramble system can be used, as long as the scramble system has a table and a seed key for referring to the table.

In this embodiment, a table for determining preset data is recorded in the lead-in area, but it is not limited thereto, and another parameter can be used, as long as the parameter can determine the table. An identifier for specifying one table among a plurality of previously known tables can be recorded.

In this embodiment, an information recording area for identifying the use as the use identifying information field is provided in the sector header field in the scrambled sector. However, it is not necessary that the field is definitely isolated, but the use can be classified by a value of the seed key.

In this embodiment, in the scrambled sector, all 2048 bytes in the main data field are subjected to the scramble-processing. However, the scramble-processing is not necessarily performed to the entire main data field, but can be performed to a predetermined part of the field.

(Fourth Embodiment)

Next, another data structure of the information recording medium according to the present invention will be described. The data structure of the information recording medium is the same as the information recording medium shown in FIG. 10. Hereinafter, only the different points from the data structure shown in FIG. 10 will be described.

Portions (a) to (c) of FIG. 13 show a data structure of a directory record recorded in the volume-file management area. In the scramble system field in the copyright managing information of the directory record is recorded a value 2 indicating a scramble system which will be described in this embodiment.

Portion (e) of FIG. 13 shows a data structure of the scrambled sector. The sector header field in the scrambled sector includes an address field, a scramble flag field, a media CGMS (Copy Generation Management System) data field, an encrypted original CGMS data field, an encrypted title key field and an encrypted use identifying information field.

In the scramble flag field is recorded a value 1 indicating that the scramble-processing has been performed.

In the media CGMS data field is recorded copy permission information of the information recording medium. In the encrypting original CGMS data field is recorded copy permission information of most original data, in the case where data of this sector is copied from another medium. Herein, the media CGMS data represents copy permission information of the data of the information recording medium. The media CGMS data is updated at the time of a copy operation. The original CGMS data represents copy permission information at the time of disk production. Since the original CGMS data is encrypted, it is copied as it is at the time of a copy operation. Table 1 shows the definition of the media CGMS data and the original CGMS data.

TABLE 1

| Media CGMS data/<br>Original CGMS data | Content |
| --- | --- |
| 00b | Copying permitted |
| 01b | Unused |
| 10b | One copying permitted |
| 11b | Copying prohibited |

Referring to Table 1, for example, when the media CGMS data is 11b and the original CGMS data is 10b, it should be determined that the data in the sector is originally in the state where only one copy is permitted (media CGMS data and original CGMS data are both 01b), and the media CGMS data is changed to 11b which means copying prohibition by having already conducted one copy operation. Hereinafter, the media CGMS data and the original CGMS data in combination are referred to as CGMS control information.

In the encrypted title key field is recorded a key for descrambling the scramble-processing performed to the main data field.

In the encrypted use identifying information field is recorded identification information for specifying the use. The encrypted original CGMS data field, the encrypted title key field and the encrypted uses identification information field are all subjected to encrypting processing, and information cannot be read simply by reading the sector header field. The encrypted data has been encrypted using an encrypted disk key recorded in the sector header field in the lead-in area of the information recording medium. Therefore, in order to decrypt the encrypted information in the scramble information sector header field, the encrypted disk key is required.

Portion (d) of FIG. 13 shows a data structure of the scramble information sector. In the following description, in order to definitely differentiate encrypted data and data whose code is decrypted, the encrypted data is denominated with "encrypted", and the data whose code is decrypted is denominated with "decrypted". For example, data obtained by encrypting the title key is referred to as an "encrypted title key", and data obtained by decrypting the encrypted title key is referred to as a "decrypted title key".

The scramble information sector is recorded in the control data area in the lead-in area.

In the sector header field in the scramble information sector is recorded a value 2 indicating that the scramble system is this type of scramble system. Furthermore, in the mutual authentication key field is recorded an mutual authentication key for use in mutual authentication processing for determining whether or not data after descrambling is to be supplied. This mutual authentication key will be described in detail later in an embodiment of an information reproducing device.

In the main data field in the scramble information sector is recorded an encrypted original CGMS data, an encrypted title key, and an encrypted disk key for decrypting an encrypted use identifying information of the scrambled sector. The encrypted disk key is further encrypted, and the key for decrypting the encrypted disk key (hereinafter, referred to as a master key) is provided by the information reproducing device.

In the main data field in the scramble information sector is recorded a plurality of encrypted disk keys such as encrypted disk key 1, encrypted disk key 2, etc. The encrypted disk key is encrypted by a corresponding master key in such a manner that the encrypted disk key 1, the encrypted disk key 2, etc. are encrypted by the master key 1, the master key 2, etc. respectively. Herein, the encrypted disk key 1, the encrypted disk key 2, etc. are obtained by encrypting the same disk key information by different master keys. Therefore, in the case where an information reproducing device A internally includes the master key 1 and another information reproducing device B internally includes the master key 2, the information reproducing device A decrypts the encrypted disk key 1 and the information reproducing device B decrypts the encrypted disk key 2, thus obtaining a decrypted disk key having the same content.

Portion (f) of FIG. 13 shows a data structure of the non-scrambled sector. In the scrambled sector flag field is recorded a value 0. The data recorded in the main data field is not subjected to scramble-processing. This indicates that the same data access as a conventional information recording disk is possible.

As described above, in the information recording medium in this embodiment, data reproduction is possible by exactly the same access as the conventional device for reproduction of the non-scrambled sector. On the other hand, in order to perform reproduction of the scrambled sector, the information reproducing device having the master key reads the scramble information sector in the lead-in area and decrypts the encrypted disk key by the master key, and further decrypts the encrypted title key of the sector header in the scrambled sector using the decrypted disk key, and performs descramble-processing of the scrambled data using the decrypted title key. Thus, data can be reproduced.

Hereinafter, the case where the scramble system described in the third embodiment is used as an example of the scramble system will be described. In the third embodiment, preset data is generated by using a conversion table. In the information recording medium in this embodiment, when an initial value for random number generation is encrypted and recorded in the encrypted title key field, scramble-processing of data can be easily performed by using the shift register 301 and the logical operation block 302 in portion (a) of FIG. 12. More specifically, the decrypted title key is used as an initial value of the shift register 302, and the shift is repeated so that a random number sequence $S_j$ is generated. Then, the logical operation of the random number sequence $S_j$ and the data sequence $D_j$ is performed, so that scramble-processing can be performed. Furthermore, descrambling of data can also be performed by using the shift register 301 in portion (a) of FIG. 12.

As described above, the information recording medium in this embodiment enables scrambling in a file unit. In addition, the information recording medium in this embodiment has information whether or not scrambling is performed as copyright managing information in the file management area and in the scramble flag field in the sector header in a unit of sector. This enables a device such as a personal computer which only recognizes main data to recognize whether or not scramble-processing is performed, and enables a device such as an optical disk drive which cannot recognize main data to recognize whether or not scramble-processing is performed. Therefore, in the case where data is to be reproduced by the optical disk drive connected to the personal computer, both of the former and the latter can determine whether or not the copyright of the data should be protected.

Furthermore, since in the information recording medium of this embodiment, different scramble-processing for every file can be performed by changing the title key, even if a scramble method for one scrambled file is decrypted by an illegal act, another scrambled file can be prevented from being descrambled by the decrypted scramble system. Thus, it is possible to enhance security in processing for copyright protection.

Furthermore, in the case where the information recording medium of this embodiment is used for the purpose of copyright protection, the scramble information sector where scramble information indispensable to descrambling is recorded exists in the lead-in area which cannot be read by an apparatus such as a personal computer. For this reason, the act of illegally reading the scramble information can advantageously be prevented. Furthermore, since the lead-in area is reproducible by the same reproducing means as the data recording area, there is no need for providing a special reproducing means.

Furthermore, since the scramble flag, the CGMS control information, the encrypted title key and the encrypted use identifying information, which are recorded in a unit of sector, are recorded in the sector header field which cannot be read by an apparatus such as a personal computer, as in the case of recording the scramble information in the lead-in area described above, the act of illegally reading the information can advantageously be prevented.

Furthermore, since the use identifying information is recorded in the sector header field, it is possible to determine depending on the content of the recorded data whether the reproducing device should perform reproduction or prohibit reproduction. Therefore, for example, by recording different identifiers between an industrial disk and a consumer disk in this area, the industrial disk can be prevented from being reproduced by a consumer reproducing device.

Furthermore, by recording a mutual authentication key for use in mutual authentication processing, the reproducing device can change data received and transmitted at the mutual authentication operation for every mutual authentication key. Thus, the processing method for the mutual authentication processing can be advantageously prevented from being illegally decrypted. Therefore, it is possible to prevent the act of illegally copying to a magnetic disk drive or the like.

Furthermore, in the information recording medium in this embodiment, a hierarchical encrypting/scramble-processing is performed in such a manner that the main data in the scrambled sector is encrypted by the title key, the title key is encrypted by the disk key, and the disk key is encrypted by the master key. For this reason, even if the main data in the scrambled sector is illegally copied, descrambling can be prevented, so that the illegal copying makes no sense.

Furthermore, since the CGMS control information is recorded, even if a file is copied from the information recording medium in this embodiment to another rewritable medium, it is possible to determine whether copying was illegal or legal.

In this embodiment, the scramble-processing is performed by the logical operation of data and the random number obtained by using the title key as the initial value. However, the scramble system is not limited thereto, but another scramble system can be used, as long as the system scrambles data in accordance with a specified key.

In this embodiment, the volume-file structure is based on ISO9660, which is the international standard, but it is not limited thereto, and another volume-file structure can be used, as long as the copyright managing information equivalent to the content described in this embodiment can be recorded in the volume-file structure.

In this embodiment, in the scrambled sector, all data in the sector is scrambled. However, the entire main data in the sector is not necessarily scrambled, but a part of the main data can be scrambled.

In this embodiment, in the scrambled file, all sectors constituting the file are subjected to the scramble-processing. However, a part of sector in the scrambled file can be subjected to the scramble-processing.

In this embodiment, the CGMS control information uses three types, i.e., one copying permitted, copying prohibition, and copying permitted, but information on two copies permitted, three copies permitted or the like can be recorded by extending allocated bits.

The scramble method of the main data described in this embodiment is only an example, and the scramble method is not limited thereto. Another method can be used, as long as scramble-processing is performed based on certain key information (title key in this embodiment).

(Fifth Embodiment)

Hereinafter, an information reproducing device for reproducing the information recording medium according to the present invention will be described with reference to the accompanying drawings. The information reproducing device is a device which can commonly reproduce the third and fourth embodiments of the information recording mediums, unless mentioned otherwise. Therefore, although an operation for reproducing the fourth embodiment of the information recording medium will be described below as an example, the third embodiment of the information recording medium can be processed in the same manner by substituting the seed key field for the encrypted title disk key, and substituting the preset data conversion table for the encrypted disk key of the scramble information sector.

FIG. 14 is a block diagram showing an information reproducing device 500 according to the present invention. The information reproducing device 500 includes a main processor 501, a bus interface circuit 503, a main memory 504, a SCSI (Small Computer System Interface) control card 506 for controlling a protocol determined by an SCSI, an AV decoder card 507 for extending compressed digital AV data to convert into an analog AV data and output the analog AV data, an optical disk drive 509 for reproducing the information recording medium of the present invention, and a hard disk drive 510.

The main processor 501, the bus interface circuit 503 and the main memory 504 are interconnected via the processor bus 502. The bus interface circuit 503, the SCSI control card 506 and the AV decoder card 507 are interconnected via a system bus 505. The SCSI control card 506, the optical disk drive 509 and the hard disk drive 510 are interconnected via a SCSI bus.

Next, a reproduction operation of an AV file by the information reproducing device 500 will be described.

When an optical disk is mounted on the optical disk drive 509, the main processor 501 reads a volume-file management area in the optical disk via the SCSI control card 506, and the main memory 504 stores the volume-file management area (hereinafter, data in the stored volume-file management area is referred to as file managing information).

The main processor 501 performs processing where the AV decoder card 507 and the optical disk drive 509 determine therebetween whether or not the other component has a copyright protection function (hereinafter, referred to as mutual authentication processing). During this processing, in the case where either one of the two components detects an error, the mutual authentication processing is regarded as having failed, and subsequent procedure is cancelled. On the other hand, in the case where the mutual authentication processing is normally ended, the optical disk drive 509 transmits the encrypted disk key of the mounted disk to the AV decoder card 507. At this time, the optical disk drive 509 further supplies an encrypted disk key obtained by encrypting based on a key generated during the mutual authentication processing (hereinafter, referred to as a bus key) at the time of outputting the encrypted disk key. The AV decoder card 507 internally retains the received encrypted disk key after decrypting it with the bus key.

Thereafter, in the case where a file recorded in the optical disk is to be reproduced, the main processor 501 refers to a scramble flag of copyright managing information in the file managing information previously stored in the main memory 504, and determines whether or not the file to be reproduced is a scrambled file. As a result of the determination, when it is determined that the file to be reproduced is an unscrambled file, the optical disk drive 509 receives a reproduction instruction from the main processor 501 via the SCSI control card 506, and transfers non-scrambled data. On the other hand, if the main processor 501 determines based on the scramble flag of the file managing information that the file to be reproduced is a scrambled file, the mutual authentication processing between the optical disk drive 509 and the AV decoder card 507 is executed.

When the main processor 501 detects an error during the mutual authentication processing, the processing is cancelled without performing reproduction processing. On the other hand, in the case where the mutual authentication processing is normally ended, the optical disk drive 509 transmits back the encrypted title key, prior to reproduction of data, and the encrypted title key is transferred to the AV decoder card 507 by the main processor 501. At this time, the optical disk drive 509 transfers the encrypted title key which is encrypted by the bus key previously retained. Furthermore, the AV decoder card 507 internally stores the received encrypted title key after decrypting it by the bus key.

Thereafter, the optical disk drive 509 supplies scrambled data read from the mounted disk, and the microprocessor 501 transfers the scrambled data to the AV decoder card 507. The AV decoder card 507 descrambles the scrambled data using the title key already stored therein, and converts it to analog AV data to output an analog signal from a video output and an audio output. As described above, the information reproducing device 500 can reproduce the information recording medium of the present invention.

As for a copy operation of a scrambled file from the optical disk drive 509 to the hard disk drive 510, since the hard disk drive 510 cannot execute the mutual authentication processing, the mutual authentication is put to an error end.

Therefore, the processing is cancelled before the optical disk drive 509 supplies data to the SCSI bus, and thus the copy operation is not executed.

Furthermore, if a program for illegally copying a scrambled file read by the optical disk drive 509 to the hard disk drive 510 is loaded to the main memory 504, the mutual authentication processing is normally ended in a certain form, and then the transferred scrambled data is copied in the hard disk drive 510, the scrambled data is copied in the hard disk drive 510. However, the mutual authentication processing between the hard disk drive 510 and the AV decoder card 507 is required once again, in order to reproduce data copied in the hard disk drive 510. In this case, since the hard disk drive 510 does not have means for generating a bus key, it is impossible that the scrambled file on the hard disk drive 510 is reproduced by the AV decoder card 507.

Therefore, even if illegal copying is made, the copy operation can make no sense. As a result, a copyright protection mechanism can be realized.

Hereinafter, further detailed structures and operations of the optical disk drive 509 and the AV decoder card 507, which are components of the information reproducing device 500, will be described with reference to FIGS. 15 and 16, respectively.

FIG. 15 is a block diagram showing the structure of the optical disk drive 509. The structure thereof will be described below. Reference numeral 600 denotes an SCSI control circuit. Reference numeral 601 denotes a decoder authentication circuit for performing a mutual authentication processing with an AV decoder. Reference numeral 602 denotes a microcontroller for controlling the entire optical disk drive. Reference numeral 603 denotes a program ROM storing an operation program of the microcontroller. Reference numeral 604 denotes a control bus for transmitting control data. Reference numeral 605 denotes an ECC (Error Correction Code) processing memory used at the time of error correction processing for correction a readout error at the time of reproducing data. Reference numeral 606 denotes a data reproducing circuit for reading data from the optical disk 607, digitalizing, demodulation, error correction processing or the like. Reference numeral 607 denotes an information recording medium of the present invention and an optical disk having the data structure shown in the third embodiment and the fourth embodiment.

Next, the operation of the optical disk drive 509 at the time of mutual authentication processing and at the time of reproducing data will be described.

The optical disk drive 509 which received a mutual authentication request by the SCSI control circuit 600 controls the decoder authentication circuit 601 so as to execute a predetermined mutual authentication processing. Since the protocol will be described in detail later, it is omitted here. In the protocol for the mutual authentication processing, in the case where the microcontroller 602 detects some error, the SCSI control circuit 600 reports an error and the mutual authentication processing and a subsequent key information transfer operation are cancelled. In the case the mutual authentication processing is normally ended, a bus key which is determined at the mutual authentication processing is stored in the decoder authentication circuit 601.

In the mutual authentication processing at the time of disk replacement and reset, following the mutual authentication processing, a read request of an encrypted disk key is issued to the optical disk drive 509. At this time, the optical disk drive 509 controls the data reproducing circuit 606, so as to read an encrypted disk key information from the optical disk 607, and further supplies an encrypted disk key encrypted using the bus key already retained in the decoder authentication circuit 601 out from the SCSI control circuit 600. On the other hand, in the case of the mutual authentication processing at the time of reproducing a scrambled file, following a normal end of the mutual processing, the optical disk drive 509 receives a readout information of an encrypted title key. At this time, the optical disk drive 509 controls the data reproducing circuit 606 so as to read an encrypted title key information from the optical disk 607, and data having been encrypted using the bus key already retained in the decoder authentication circuit 601 is supplied out from the SCSI control circuit 600.

In response to a reproduction request of a file data issued thereafter, the optical disk drive 509 supplies out scrambled data read from the optical disk 607 from the SCSI control circuit 600. This is the end of the description of the optical disk drive 509.

Although the optical disk drive 509 in this embodiment receives a transfer request of an encrypted disk key, and then reproduces an encrypted disk key field of the optical disk 607, the optical disk drive 509 can read it at the time of mounting the optical disk 607, and internally retains it.

Next, the structure and the operation of the AV decoder card will be described with reference to FIG. 16.

FIG. 16 is a block diagram showing the structure of the AV decoder card 507. The components thereof will be described below. Reference numeral 700 denotes a system interface circuit for controlling reception and transmission of information with a system bus. Reference numeral 701 denotes a drive authentication circuit for performing mutual authentication processing with the optical disk drive 509. Reference numeral 702 denotes a microcontroller for controlling the entire AV decoder card 507. Reference numeral 703 denotes a program ROM where an operation program of the microcontroller 702 is stored. Reference numeral 704 denotes a control bus for transmitting control information. Reference numeral 705 denotes a descramble circuit for descrambling scrambled data. Reference numeral 706 denotes an audio/video decoder circuit for extending compressed AV digital data and converting it to an analog AV data. Reference numeral 707 denotes an audio/video decoding memory, an operating memory, which the audio/video decoder circuit 706 uses for data conversion.

Next, the operation of the AV decoder card 507 at the time of mutual authentication processing and scrambled file reproduction will be described.

First, at the time of mutual authentication processing at the time of reset and media replacement, the microcontroller 702 controls the drive authentication circuit 701 so as to execute mutual authentication processing with the optical disk drive 509 in accordance with a predetermined protocol. In the case where the drive authentication circuit 701 detects an error at the time of mutual authentication processing, the error is reported via the system interface circuit 700, and the processing is cancelled. On the other hand, in the case where the mutual authentication processing is normally ended, the drive authentication circuit 701 internally retains a bus key determined in the mutual authentication processing.

Furthermore, the AV decoder card 507 receives an encrypted disk key from the system interface circuit 700. Since the received encrypted disk key has been encrypted with the bus key in the optical disk drive 509, the AV decoder card 507 decrypts the encrypted disk key with the bus key already retained in the drive authentication circuit 701, and then transfers it to the descramble circuit 705. The descramble circuit 705 internally stores the received encrypted disk key.

On the other hand, at the time of reproducing a scrambled file, prior to the reproduction of the file, the mutual authentication processing with the optical disk drive 509 is executed once again. Here, again, in the case where an error occurs in the mutual authentication processing, the mutual authentication processing and the subsequent file reproduction operation are cancelled. In the case where the mutual authentication processing is normally ended without any error, the AV decoder card 507 receives an encrypted title key via the system interface circuit 700. Since the encrypted title key has been further encrypted with the bus key in the optical disk drive 509, the encrypted title key is decrypted with the bus key retained in the drive authentication circuit 701, and transfers the result to the descramble circuit 705. The descramble circuit 705 internally stores the received encrypted title key.

Thereafter, scrambled data of the scrambled file received from the system interface circuit 700 is transferred to the descramble circuit 705 as it is, and is subjected to descramble-processing based on the title key already retained and transferred to the audio/video decoder circuit 706 so as to be converted to an analog AV signal and output.

As described above, according to the information reproducing device 500 of this embodiment, the optical disk drive 509 includes the decoder authentication circuit 601, and the AV decoder card 507 includes the drive authentication circuit 701. For this reason, key information is not supplied to an apparatus which has an objective of illegally copying a file. Thus, even if data of a scrambled file is illegally copied, copied data makes no sense by not supplying the key information for executing descrambling. Therefore, an effect of protecting copyright of the file is provided.

According to the information reproducing device of this embodiment, since the AV decoder card 507 internally has the descramble circuit 705 for performing descramble-processing depending on the key information, it is possible to descramble the scrambled data for reproduction.

In this embodiment, an SCSI bus is used for the bus connected to the optical disk drive 509. However, the bus is not limited thereto, and a bus compliant with ATAPI (AT Attachment Packet Interface) or IEEE 1394 (Institute of Electrical and Electronics Engineers 1394) can be used, as long as reproduction data can be transferred in accordance with a predetermined protocol.

In this embodiment, the function of the decoder authentication circuit 601 and the function of the drive authentication circuit 701 can be realized by a software executed by the microcontrollers 602 and 702.

(Sixth Embodiment)

Next, an information reproducing device 800 according to the present invention will be described.

FIG. 17 is a block diagram showing the structure of the information reproducing device 800 according to the present invention. The structure of the information reproducing device 800 is the same as that of the information reproducing device 500 shown in FIG. 14, except that an SCSI control circuit for performing communication compliant with the SCSI system is incorporated into an AV decoder card 801. Therefore, the same components bears the same reference numerals, and the description thereof is omitted.

Next, the operation of the information reproducing device 800 will be described.

Since the SCSI control circuit incorporated AV decoder card 801 internally includes the SCSI control circuit, when a scrambled file reproduction request of the optical disk drive 509 is issued from the main processor 501, the mutual authentication processing between the SCSI control circuit incorporated AV decoder card 801 and the optical disk drive 509 is directly executed. More specifically, the SCSI control circuit incorporated AV decoder card 801 issues a command sequence for mutual authentication to the optical disk drive 509, the optical disk drive 509 responds to the command. In this manner, the mutual authentication processing is performed.

Furthermore, likewise in an operation of reproducing data, it is the SCSI control circuit incorporated AV decoder card 801 that makes a reproduction request to the optical disk drive 509, not the main processor 501. Therefore, data read by the optical disk drive 509 is directly input to the SCSI control circuit incorporated AV decoder card 801 and converted to an analog AV signal and output.

FIG. 18 is a block diagram showing the structure the SCSI control circuit incorporated AV decoder card 801. Hereinafter, only different points from the structure of the AV decoder card 507 shown in FIG. 16 will be described.

Reference numeral 900 denotes a SCSI control circuit for controlling reception and transmission of data with SCSI bus 508. Reference numeral 901 denotes a program ROM where a program to be executed by the microcontroller is stored.

When a reproduction request for a scrambled file is input to the system interface circuit 700, the microcontroller 702 controls the drive authentication circuit 701 and the SCSI control circuit 900 so as to execute the mutual authentication processing with the optical disk drive 509. At this time, in a mutual authentication protocol, a command is directly issued from the SCSI control circuit 900 to the optical disk drive 509. Furthermore, the microcontroller 702 controls the drive authentication circuit 701 in accordance with the mutual authentication protocol so as to perform mutual authentication processing. In the case where the mutual authentication processing is ended by an error, the microcontroller 702 controls the system interface circuit 700 to report the error to the main processor 501 so that the processing is ended. On the other hand, in the case where the mutual authentication processing is normally ended, data of a scrambled file is directly received by the SCSI control circuit 900 from the optical disk drive 509, and data descrambled by the descramble circuit 705 is converted to an analog AV signal by the audio/video decoder circuit 706 and output. Connected to decoder circuit 706 is audio/video decoding memory 707. By the procedure described above, as in the case of the information reproducing device of the fifth embodiment, AV data can be reproduced while preventing the copy operation which infringes copyright of data recorded in the information recording medium of the present invention.

As described above, according to the information reproducing device 800 of this embodiment, in addition to the feature of the information reproducing device of the fifth embodiment, since the optical disk drive 509 and the SCSI control circuit incorporated AV decoder card 801 directly receive and transmit commands and data, security against illegal decrypting a mutual authentication system and key information, and the execution of an unjust copy operation can be enhanced.

Although the information recording medium to be reproduced has been described using the fourth embodiment of the information recording medium according to the present invention, the same processing is possible for the third embodiment of the information recording medium according to the present invention , as long as the encrypted title key is replaced by the seed key, and the encrypted disk key is replaced by conversion table information of the scramble information sector.

In this embodiment, an SCSI bus is used for the bus connected to the optical disk drive 509. However, the bus is not limited thereto, and an interface such as an ATAPI or an IEEE 1394 can be used, as long as reproduction data can be transferred in accordance with a predetermined protocol.
(Seventh Embodiment)

Next, an information reproducing device 1000 according to the present invention will be described.

FIG. 19 is a block diagram showing the structure of the information reproducing device 1000 according to the present invention. The information reproducing device 1000 is an optical disk player. The components of the information reproducing device 1000 are the same as those of the information reproducing device shown in FIG. 14 or the information reproducing device shown in FIG. 17, except for a program ROM 1001. Therefore, the same components bear the same reference numerals, and the description thereof is omitted. The description herein is based on the fourth embodiment of the information recording medium.

At the time of the reset or disk insertion in the optical disk player 1000, the microcontroller 702 controls the data reproduction circuit 606 by way of control bus 1002 and reads a scramble information sector of a lead-in area of the optical disk. An encrypted disk key information read from the scramble information sector is transferred to the descramble circuit 705 and internally retained.

On the other hand, in reproducing a scrambled file recorded in the optical disk 607, the microcontroller 702 controls the data reproduction circuit 606, reads an encrypted title key from a sector header field of the scrambled file to be reproduced, and transfers it to the descramble circuit 705. The descramble circuit 705 stores the received title key and judges use identifying information. As a result of the determination, in the case reproduction is prohibited, the descramble circuit 705 reports an error to the microcontroller 702. On the other hand, in the case where the descramble circuit 705 determines that reproduction is permitted, the data reproduction circuit 606 reads data of the scrambled file, and transfers the read scrambled data to the descramble circuit 705. The descramble circuit 705 descrambles the scrambled data using a disk key and a title key previously stored, and transfers the result to the audio/video decoder circuit 706. The audio/video decoder circuit 706 converts the received data to an analog AV signal and performs audio/video outputs.

In this manner, the optical disk player 1000 can descramble the scrambled data for reproduction. However, the optical disk player 1000 is different from the fifth and the sixth embodiments of the information reproducing device of the present invention in that it performs video reproduction without executing the mutual authentication processing. This is because, since reproduced data is directly input to the audio/video decoder circuit 706 in this embodiment, a copy operation to other rewritable media such as a hard disk drive cannot be performed in the middle of the procedure, and thus the mutual authentication processing is not required. Therefore, in the structure of this embodiment, without the component which executes the mutual authentication processing, the copyright protection is possible. Furthermore, since the optical disk player 1000 judges use identifying information at the time of reproduction, data whose reproduction is prohibited for its use can be prevented from being reproduced.

Hereinafter, the further detailed structures and operations of a decoder authentication circuit 601, a drive authentication circuit 701 and a descramble circuit 705, which are used in the fifth and the sixth embodiments of the information reproducing device of the present invention, will be described. The structure described below is a structure common to the fifth embodiment, sixth embodiment and seventh embodiment.

First, the structure and the operation of the descramble circuit 705 with be described with reference to the accompanying drawing. The descramble circuit 705 highly depends on a scramble system, so that the structure in the case of reproducing the third embodiment of the information recording medium of the present invention is different from that in the case of reproducing the fourth embodiments of the information recording medium. Therefore, in the following description, the descramble circuit for reproducing the third embodiment of the information recording medium of the present invention will be described with reference to FIGS. 20 and 21. The descramble circuit for reproducing the fourth embodiment of the information recording medium of the present invention will be described with reference to FIGS. 22 and 23.

FIG. 20 is a block diagram showing the structure of the descramble circuit 1106 for reproducing the third embodiment of the information recording medium of the present invention. Hereinafter, each component will be described. Reference numeral 1100 denotes an I/O control circuit for performing communication with the control bus 704. Reference numeral 1101 denotes a selector for switching a block to which an output is directed (hereinafter, referred to as a targeted block for output), depending on the content of the input data. Reference numeral 1102 denotes a use identifying circuit for determining whether or not reproduction is permitted, referring to the use identifying information of a reproduction file. Reference numeral 1103 denotes a conversion table memory circuit for storing a conversion table to generate preset data for a random number generating circuit 1104 from the seed key. Reference numeral 1104 denotes the random number generating circuit for generating a random number based on preset data output from the conversion table memory circuit 1103. Reference numeral 1105 denotes a main data descramble circuit for performing descramble-processing by performing a logical operation between the random number generated by the random number generating circuit 1104 and scrambled data input from the selector 1101.

Next, the operation of the descramble circuit 1106 will be described.

First, in the case where a scramble information sector recorded in the lead-in area is to be read after the mutual authentication processing is normally ended, a scramble information sector readout is set to the selector 1101 via the I/O control circuit 1100, and the selector 1101 sets a targeted block for output to the conversion table memory circuit 1103. Read data which is input is supplied to the conversion table memory circuit 1103 via the selector 1101, and stored as a conversion table for determining preset data which is to be used as an initial value for the random number generation.

On the other hand, at the time of reproducing a scrambled file, mutual authentication processing is performed prior to reproduction of data, and use identifying information in the sector header field received after normal end of the mutual authentication processing is input to the use identifying circuit 1102, and the seed key is input to the conversion table memory circuit 1103. The use identifying circuit 1102 internally has information regarding the use identifying information which is permitted to be reproduced, identifies whether or not the reproduction is permitted by comparing it with the input use identification information, and reports the I/O control circuit 1100 and the main data descramble circuit 1105. On the other hand, the conversion table memory circuit 1103 which receives the seed key outputs a preset data corresponding to the seed key based on the received seed key to the random number generating circuit 1104. The random number generating circuit 1104 generates a random number sequence based on the received preset data and outputs it to the main data descramble circuit 1105. Following the sector header field, when the main data of the scrambled sector is to be input, a targeted block for output of the selector 1101 is switched to the main data descramble circuit 1105. Thereafter, the main data descramble circuit 1105 executes descramble-processing by performing a logical operation between the main data input from the selector 1101 and the random number sequence input from the random number generating circuit 1104, and outputs descrambled data to the audio/video decoder circuit 706.

The operation described above will be explained in greater detail with reference to FIG. 21 below.

FIG. 21 is a flow chart explaining the content of the descramble-processing in the descramble circuit 1106, in the case where the third embodiment of the information recording medium of the present invention is reproduced. Each step will be described below.

(S1200): A targeted block for output of the selector 1101 is switched to the conversion table memory circuit 1103, and a conversion table read from the scramble information sector of the lead-in area of the information recording medium is stored in the conversion table memory 1103.

(S1201): A targeted block for output of the selector 1101 is switched to the I/O control circuit 1100, and a scramble flag in the sector header received prior to reproduction of the scrambled file is transmitted back to the microcontroller 702. The microcontroller 702 determines whether or not the scramble flag is 1, and transmits back the determined result to the I/O control circuit 1100. When it is determined that the scramble flag is 1, the procedure goes to step (S1202). When it is determined that the scramble flag is 0, the procedure goes to step (S1206) with the function of the main data descramble circuit 1105 stopped.

(S1202): A targeted block for output of the selector 1101 is switched to the use identifying circuit 1102, and use identifying information in the sector header received prior to reproduction of the scrambled file is transferred. The use identifying circuit 1102 determines whether or not reproduction of the file is permitted, by comparing the received use identifying information with reproduction permission information internally retained. When it is determined that reproduction is prohibited, the procedure goes to step (S1203). When it is determined that reproduction is permitted, the procedure goes to step (S1204).

(S1203): In the case where it is determined at the above processing step (S1202) that reproduction of the file is prohibited, an error is reported to the microcontroller 702 via the I/O control circuit 1100 in this step, and the processing is ended.

(S1204): A seed key read from the sector header of the scrambled file to be reproduced is input to the conversion table memory circuit 1103, and preset data is generated from the seed key and the conversion table and output to the random number generating circuit 1104.

(S1205): A targeted block for output of the selector 1101 is switched to the main data descramble circuit 1105, and main data of an input scrambled file is transferred to the main data descramble circuit 1105. On the other hand, the random number generating circuit 1104 generates a random number sequence based on preset data input from the conversion table memory circuit 1103 and outputs it to the main data descramble circuit 1105. The main data descramble circuit 1105 executes descramble-processing by performing a logical operation between the input main data and the random number sequence.

(S1206): The main data descramble circuit 1105 outputs descrambled data at the time of executing the descrambling, and outputs data input from the selector 1101 as it as when the descramble function is stopped, to the audio/video decoder circuit 706.

As described above, the descramble circuit 1106 includes the use identifying circuit, so that it is possible to selectively reproduce a file having the use identifying information for which reproduction is prohibited and a file having the use identifying information for which reproduction is permitted.

Furthermore, the descramble circuit 1106 internally includes the selector for separating a scramble identification flag, so that it is possible to separate only a scramble flag so as to determine whether or not to perform descrambling.

Furthermore, since a conversion table for converting to preset data can be determined in a unit of disk, and a seed key can be determined in a unit of file, it is possible reproduce the information recording medium having a scramble system with security so high that reproduction cannot be made without both of the two data.

FIG. 22 is a block diagram showing the structure of the descramble circuit 1308 for reproducing the fourth embodiment of the information recording medium of the present invention. Hereinafter, each component will be described. Reference numeral 1300 denotes an I/O control circuit for performing communication with the control bus 704. Reference numeral 1301 denotes a selector for switching a targeted block for output, depending on the content of the input data. Reference numeral 1302 denotes a disk key decrypting circuit for decrypting an encrypted disk key in the case where the encrypted disk key is input. Reference numeral 1303 denotes a master key storage section for storing a master key to be used for decrypting the encrypted disk key in a hardware manner. Reference numeral 1304 denotes a sector header decrypting circuit for receiving a disk key decrypted by the disk key decrypting circuit 1302, and decrypting the encrypted section in the sector header. Reference numeral 1305 denotes a CGMS checking circuit for confirming conformity between an original CGMS data decrypted by the sector header decrypting circuit 1304 and media CGMS data input from the selector. Reference numeral 1306 denotes a use identifying circuit for receiving use identifying information decrypted by the sector header decrypting circuit 1304 and determining whether or not reproduction is permitted. Reference numeral 1307 denotes a main data scramble circuit for descrambling main data input from the selector 1301 based on the title key input from the sector header decrypting circuit 1304.

Hereinafter, the descramble circuit 1308 will be described.

First, in the case where a scramble information sector recorded in the lead-in area is read after the mutual authentication processing is normally ended, a targeted block for output of the selector 1301 is set to the disk key decrypting circuit 1302 via the I/O control circuit 1300, and input read data is input to the disk key decrypting circuit 1302 via the selector 1301. The disk key decrypting circuit 1302 decrypts a disk key based on the master key input from the master key storage section 1303, and the disk key is stored in the disk key decrypting circuit 1302.

On the other hand, at the time of reproducing a scrambled file, the mutual authentication processing is performed prior to reproduction of data. When the mutual authentication processing is normally ended, the sector header of the scrambled file to be reproduced is input to the selector 1301. The selector 1301 selects a targeted block for output thereof for every content of the sector header, and outputs a scramble flag to the microcontroller 702 via the I/O control circuit 1300, outputs media CGMS data to the CGMS checking circuit 1305, and outputs encrypted original CGMS data and encrypted use identifying information and encrypted title key (hereinafter, referred to as an encrypted sector header in combination) to the sector header decrypting circuit 1304. The sector header decrypting circuit 1304 receives disk key from the disk key decrypting circuit 1302, decrypts the encrypted sector header based on the disk key, and outputs the original CGMS data to the CGMS checking circuit 1305, outputs use identifying information to the use identifying circuit 1306, and outputs the title key to the main data descramble circuit 1307. The CGMS checking circuit 1305 receives media CGMS data input from the selector 1301 and the original CGMS input from the sector header decrypting circuit 1304, and determines whether or not the value indicates that reproduction is permitted. At this time, criteria of the determination of the CGMS checking circuit 1305 are shown in (Table 2). (The meanings represented by the media CGMS data and the original CGMS data are consistent with the explanation of the fourth embodiment of the information recording medium of the present invention.)

TABLE 2

| Medium identification information | Media CGMS data | Original CGMS data | CGMS determination information |
|---|---|---|---|
| 1 |  | 00 | 1 |
| (Reproduction only medium) |  | 01/10/11 | 0 |
|  | 01 | 00/01/10/11 | 0 |
|  | 10 | 00/01/11 | 0 |
|  |  | 10 | 1 |
|  | 11 | 00/01/10 | 0 |
|  |  | 11 | 1 |
| 0 | 00 | 00 | 1 |
| (Rewritable medium) |  | 00/10/11 | 0 |
|  | 01/10 | 00/01/10/11 | 0 |
|  | 11 | 10 | 1 |
|  |  | 00/01/11 | 0 |

In Table 2, in the case where the CGMS determination information represents 1, the CGMS checking circuit reports to the main data descramble circuit 1307 and the microcontroller 702 that reproduction is possible. On the other hand, in the case where the CGMS determination information represents 0, which is an inappropriate value indicating that illegal copying or the like is possibly made, the CGMS checking circuit reports an error to the main data descramble circuit 1307 and the microcontroller 702. For example, in Table 2, in the case where the medium identification information is 0 indicating a rewritable medium, the media CGMS data is 11 showing copy prohibited, and the original CGMS data is 10 showing one copying permitted, it is believed that a file which is permitted to be copied only once has been already copied once to a rewritable medium, so that only the media CGMS data becomes 11, and the file is changed to be prohibited from being copied. Therefore, the output is 1 meaning that reproduction is permitted. On the other hand, if the file which is permitted to be copied once is illegally copied, both of the media CGMS data and the original CGMS data become 10 meaning that only one copying is permitted. Therefore, the CGMS determination information is 0 meaning that reproduction is prohibited. On the other hand, the use identifying circuit 1306 internally includes use identifying information for which reproduction is permitted, and determines whether or not the scrambled file is to be used for something whose reproduction is permitted, by comparing the information with the use identifying information input from the sector header decrypting circuit 1304. In the case of the use identifying information for which reproduction is not permitted, an error is reported to the microcontroller 702 and the main data descramble circuit 1307. In the case where the data of the scrambled file is to be reproduced, a targeted block for output of the selector 1301 is switched to the main data descramble circuit 1307, and read data which is input is transferred to the main data descramble circuit 1307. The main data descramble circuit 1307 receives the title key from the sector header decrypting circuit 1304 and performs descramble-processing of the scrambled data based on the received title key to output to the audio/video decoder circuit 706.

As described above, the descramble circuit 1308 decrypts the encrypted disk key and the encrypted title key, performs descramble-processing for the main data when the title key indicates that reproduction is permitted, and outputs scrambled digital AV data to the audio/video decoder circuit 706.

Next, the operation of reproduction processing of the scrambled file in the descramble circuit 1308 will be described with reference to the flow chart shown in FIG. 23. Processing content at each step is shown below.

(S1400): In the case where the encrypted disk key information in the lead-in area is input to the read data, a targeted block for output of the selector 1301 is set to the disk key decrypting circuit 1302, and the encrypted disk key is transferred to the disk key decrypting circuit 1302. The disk key decrypting circuit 1302 receives a master key from the master key storage section 1303, and decrypts the encrypted disk key and outputs the decrypted disk key to the sector header decrypting circuit 1304.

(S1401): The selector 1301 separates a scramble flag from the sector header of the scrambled file read prior to reproduction, and transfers it to the microcontroller 702 via the I/O control circuit 1300. The microcontroller 702 determines whether or not the scramble flag is 1. When the determined result is 1, the procedure goes to step (S1402). When the determined result is not 1, the procedure goes to step (S1407).

(S1402): The selector 1301 separates an encrypted sector header from the sector header of the scrambled file read prior to reproduction, and transfers it to the sector header decrypting circuit 1304. The sector header decrypting circuit 1304 decrypts the received encrypted sector header based on a disk key previously received from the disk key decrypting circuit 1302, separates it by its content, and outputs original CGMS data to the CGMS checking circuit 1305, outputs the use identifying information to the use identifying circuit 1306, and outputs the title key to the main data descramble circuit 1307.

(S1403): The CGMS checking circuit 1305 outputs CGMS determination information in accordance with Table 2 from medium identifying information received from the microcontroller 702, media CMGS data received from the selector 1301 and original CGMS data received from the sector header decrypting circuit 1304. In Table 2, in the case where CGMS determination information is 1, the CGMS checking circuit reports to the I/O control circuit 1300 and the main data descramble circuit 1307 that it is a normal CGMS control information.

(S1404): In the case where the CGMS determined result is 0, the CGMS checking circuit 1305 reports an error to the I/O control circuit 1300 and the main data descramble circuit 1307. In the case where the use identifying information indicates that reproduction is prohibited for its use, the use identifying circuit 1306 reports an error to the I/O control circuit 1300 and the main data descramble circuit 1307. Thus, the reproduction processing is ended.

(S1405): The use identifying circuit 1306 determines the use identifying information received from the sector header decrypting circuit 1304, and in the case where reproduction is permitted, the use identifying circuit 1306 reports to the I/O control circuit 1300 and the main data descramble circuit 1307 that the file is one whose reproduction is permitted.

(S1406): When the selector 1301 receives the main data of a scrambled file as readout data, the main data descramble circuit 1307 is set as a targeted block for output thereof, and the main data is transferred thereto. The main data descramble circuit 1307 executes descramble-processing of the input main data, based on the title key received from the sector header decrypting circuit 1304.

(S1407): In the case where the main data descramble circuit 1307 has executed the descramble-processing, the descrambled main data is output to the audio/video decoder circuit 706. In the case where the main data descramble circuit 1307 has not executed the descramble-processing, the data input from the selector 1301 is output as it is to the audio/video decoder circuit 706.

As described above, the descramble circuit 1308 includes the use identifying circuit, so that it is possible to selectively reproduce a file having the use identifying information for which reproduction is prohibited and a file having the use identifying information for which reproduction is permitted.

Furthermore, the descramble circuit 1308 internally includes the selector for separating a scramble identification flag, so that it is possible to separate only a scramble flag so as to determine whether or not to perform descrambling.

Furthermore, even for a disk of high security, which is hierarchically encrypted/scrambled, such as the fourth embodiment of the information recording medium of the present invention, by allowing the disk key decrypting circuit, the sector header decrypting circuit, the main data descramble circuit to operate in association with each other, the procedure can be the same as that when descrambling is not performed.

Furthermore, the descramble circuit includes the CGMS checking circuit 1305, so that illegally copied data can be detected, thus making it possible to prevent the illegally copied data from being reproduced. Furthermore, the descramble circuit has a mechanism which protects copyright of the information recording medium recorded a software which allows for control the generation of copying, namely, how many times data is copied, and permits only a predetermined number of copying operations.

FIG. 24 is a block diagram showing the detailed structure of the decoder authentication circuit 601 in the optical disk drive 509. Hereinafter, each component will be described. Reference numeral 1500 denotes an I/O control circuit for controlling input and output so as to perform communication with the microcontroller 602. Reference numeral 1501 denotes a random number generating circuit for generating a random number, based on a time variable key input from the I/O control circuit 1500. Reference numeral 1502 denotes a function fk(R1) generating circuit for determining a function fk by a first input (represented by k in FIG. 24) for determining the function, and calculating a function value fk(R1) from the second input (represented by R1 in FIG. 24), which is an argument of the function fk, and outputting the function value fk(R1). Similarly, reference numeral 1503 denotes a function gk(R2) generating and comparing circuit for calculating a function value gk(R2) from k and R2 and outputting the function value gk(R2), and comparing it with decoder response data input from the I/O control circuit 1500. Reference numeral 1504 denotes a bus key generating circuit for generating a bus key, based on two function values output from the function gk(R2) generating and comparing circuit 1503 and the function fk(R1) generating circuit 1502. Reference numeral 1505 denotes a bus encrypting circuit for encrypting data output from the data reproducing circuit 606 in accordance with a bus key output from the bus key generating circuit 1504.

Hereinafter, the operation of the decoder authentication circuit 601 will be described.

At the time of reset and disk replacement for the optical disk drive 509, the microcontroller 602 previously sets a mutual authentication key k read from the sector header in the scramble information sector in the lead-in area of the disk to the function fk(R1) generating circuit 1502 and the function gk(R2) generating and comparing circuit 1503 via the I/O control circuit 1500.

The function fk(R1) generating circuit 1502 internally retains the mutual authentication key k, and thereafter calculates a function fk(R1) when a random number value R1 is input at the time of mutual authentication processing, and outputs the function fk(R1) to the bus key generating circuit 1504 and the I/O control circuit 1500.

The bus key generating circuit 1504 internally stores the input function fk(R1). Subsequently, in the case where a time variable key for generating a random number is input from the microcontroller 602 via the I/O control circuit 1500, the random number generating circuit 1501 generates a random number R2 based on the time variable key and transmits back it to the I/O control circuit 1500, and outputs it to the function gk(R2) generating and comparing circuit 1503.

The function gk(R2) generating and comparing circuit 1503 which has received the random number R2 calculates the function value gk(R2) from the mutual authentication key k previously retained and the random number R2, and internally retains it. Furthermore, the function gk(R2) generating and comparing circuit 1503 receives decoder response data from the I/O control circuit 1500, and compares it with internally calculated function gk(R2). As a result of the comparison, in the case where the value of gk(R2) and the decoder response data are not matched, the function gk(R2) generating and comparing circuit 1503 reports that an error occurs in the mutual authentication processing to the microcontroller 602 via the I/O control circuit 1500. In the case where the mutual authentication processing fails, the processing following the mutual authentication processing such as transfer of the encrypted disk key and the encrypted title key or the like are cancelled.

On the other hand, in the case where the two values, gk(R2) and the decoder response data, are matched, it is determined that the mutual authentication processing is normally ended, and the function value gk(R2) is output to the bus key generating circuit 1504. At this time, only in the case where the function values fk(R1) and gk(R2) are normally input, the bus key generating circuit 1504 generates a bus key based on the two function values fk(R1) and gk(R2), and outputs the bus key to the bus encrypting circuit 1505.

The bus encrypting circuit 1505 receives a control signal for switching mode (hereinafter, referred to as a mode control signal) from the microcontroller 602 via the I/O control circuit 1500. When the mode is a disk key reproduction mode or a title key reproduction mode, the bus encrypting circuit 1505 performs a predetermined encrypting to an encrypted disk key or an encrypted title key input from the data reproducing circuit 606, based on a previously input bus key, and then outputs the result to the SCSI control circuit 600.

On the other hand, after supplying out the encrypted title key, in the case where an actual file data is to be supplied out, the mode control signal is switched to the data reproduction mode, and the bus encrypting circuit 1505 outputs the data output from the data reproducing circuit 606 to the SCSI control circuit 600 without encrypting.

As described above, the decoder authentication circuit 601 calculates a function value determined by the mutual authentication key in the mutual authentication processing, and only in the case where the function value is matched with the function value supplied from the decoder, the mutual authentication processing is normally ended. Furthermore, in the reproduction operation, at the time of transfer of the encrypted disk key and the encrypted title key, key information which is further encrypted using the bus key generated in the mutual authentication processing is supplied out.

Next, the structure of the operation of the drive authentication circuit 701 on the AV decoder card 507 and the SCSI control circuit incorporated AV decoder card 801 will be described with reference to the accompanying drawings.

FIG. 25 is a block diagram showing the structure of the drive authentication circuit 701. Hereinafter, each component will be described. Reference numeral 1600 denotes an I/O control circuit for receiving and transmitting a control signal from and to the microcontroller 702. Reference numeral 1601 denotes a random number generating circuit for receiving a time variable key from the I/O control circuit 1600 so as to generate a random number R1 and transmitting back it to the I/O control circuit 1600 and outputting it to a function fk(R1) generating and comparing circuit 1603. Reference numeral 1602 denotes a function gk(R2) generating circuit for calculating a function gk(R2) based on a constant k input from the function fk(R1) generating and comparing circuit 1603 and the random number R2 input from the I/O control circuit 1600. Reference numeral 1603 denotes a function fk(R1) generating and comparing circuit for calculating a function value fk(R1) with respect to k which is 1 to n, based on R1 input from the random number generating circuit 1601 and comparing it with drive response data input from the I/O control circuit 1600. Reference numeral 1604 denotes a bus key generating circuit for generating a bus key from a function value output from the function gk(R2) generating circuit 1602 and a function value output from the function fk(R1) generating and comparing circuit 1603. Reference numeral 1605 denotes a bus decrypting circuit for decrypting data by a bus key output from the bus key generating circuit 1604.

Next, the operation of the drive authentication circuit 701 will be described.

First, at the start of the mutual authentication processing, the drive authentication circuit 701 receives a time variable key for a random number generation from the microcontroller 702 via the I/O control circuit 1600, and the random number is generated by the random number generating circuit 1601.

The random number generating circuit 1601 outputs the generated random number R1 to the function fk(R1) generating and comparing circuit 1603 and the microcontroller 702. Thereafter, the function fk(R1) generating and comparing circuit 1603 receives drive response data from the microcontroller 702, and calculates functions f(R1), f2(R2), f3(R3) . . . using the random value R1 internally retained as an argument, and obtains k which allows the drive response data to be matched with fk(R1). At this time, in the case where k which allows matching with the drive response data is not obtained despite the calculation for all of the retained functions, the function fk(R1) generating and comparing circuit 1603 transmits back an error to the microcontroller 702 via the I/O control circuit 1600 as an authentication result.

On the other hand, in the case where k which allows the drive response data to be matched with fk(R1) is obtained, the function fk(R1) generating and comparing circuit 1603 transmits back a normal end to the microcontroller 702 as an authentication result, and outputs k to the function gk(R2) generating circuit 1602 and outputs the function value fk(R1) to the bus key generating circuit 1604. In the case where the value of k is normally found out, the drive authentication circuit 701 subsequently receives the random number R2 from the microcontroller 702, and inputs it to the function gk(R2) generating circuit 1602. The function gk(R2) generating circuit 1602 calculates the function gk(R2) from the value k previously received from the function fk(R1) generating circuit 1603 and the input random number R2, and outputs the obtained function value to the microcontroller 702 and the bus key generating circuit 1604.

The bus key generating circuit 1604 generates a bus key based on the previously received function values fk(R1) and gk(R2), and outputs the bus key to the bus decrypting circuit 1605. On the other hand, in the case where the function value gk(R2) supplied to the microcontroller 702 is normally authenticated by the optical disk drive 509, the microcontroller 702 switches the mode control signal, and switches the mode of the bus decrypting circuit 1605 to the disk key reproduction mode or the title key reproduction mode, so that the bus decrypting circuit is ready to be used for decrypting processing.

At this time, data (encrypted disk key or encrypted title key) input from the SCSI control circuit 900 or the system interface circuit 700 is decrypted by the bus key previously retained in the bus decrypting circuit 1605. However, it is only the bus code that decrypted by the bus decrypting circuit 1605, and the encrypted disk key encrypted by the master key and the encrypted title key encrypted by the disk key are output as encrypted they are to the descramble circuit 705.

Thereafter, when reproduction data of a scrambled file is input from the SCSI control circuit 900 or the system interface circuit 700, the bus decrypting circuit 1605 is switched to the data reproduction mode by the mode control signal from the microcontroller 702, and transfers data to the descramble circuit 705 as it is without performing decrypting processing with the bus key.

As described above, the drive authentication circuit 701 calculates a plurality of function values from the internally generated random number, and authenticates the drive by the matching of the drive response data with either one of the plurality function values. On the contrary, by receiving the random number and calculating the internal function values to transmit back, the drive authentication circuit is authenticated by the optical disk drive 509. In this manner, the mutual authentication processing is performed.

Furthermore, for the reproduction operation, at the time of receiving the encrypted disk key and the encrypted title key, decrypting processing is performed using the bus key generated in the mutual authentication processing.

Next, the protocol of the mutual authentication processing executed in the fifth and the sixth embodiments of the information reproducing device of the present invention will be described with reference to the accompanying drawings.

FIG. 26 is a flow chart for explaining the mutual authentication processing between the optical disk drive 509 and the AV decoder card 507 or the SCSI control circuit incorporated AV decoder card 801.

The mutual authentication processing is executed as necessary, such as at the time of reset of the apparatus and disk replacement, and when a file to be read is confirmed to be a scrambled file by the file managing information. Each step of processing will be described below. Hereinafter, the AV decoder card 507 or the SCSI control circuit incorporated AV decoder card 801 are simply referred to as an AV decoder. Furthermore, hereinafter, a command on the SCSI protocol is referred to as a device command.

(S1700): The AV decoder generates a random number R1 based on a time variable key which is variable over time generated using a timer or the like.

(S1701): The optical disk drive receives the random number R1 generated by the AV decoder, by a device command "SEND R1". At this time, when the optical disk drive has not stored a mutual authentication key k of the mounted disk yet, readout of the mutual authentication key from the sector header field of the scramble information sector in the lead-in area is executed.

(S1702): In the case where the optical disk drive detects an error during the procedure of step (S1701) and the error is reported, the procedure goes to step (S1713). When the step (S1701) is normally ended, the procedure goes to step (S1703).

(S1703): The optical disk drive receives a device command "REPORT fk(R1)", calculates a function fk(R1) based on the previously received random value R1 and a value of the mutual authentication key k read from the disk, and transmits the calculated result back to the AV decoder. In the processing described above, in the case where an error occurs, the optical disk drive reports the error as a result of the command processing.

(S1704): When an error occurs during the device command "REPORT fk(R1)" processing, and the command processing result is an error, the procedure goes to step (S1713). When the processing result is a normal end, the procedure goes to step (S1705).

(S1705): The AV decoder calculates a function value fi(R1) with respect to i (i is a positive integer) from 1 to n (n is a positive integer), using the internally retained function value generating circuit, and compares the calculated value of fi(R1) with the value of fk(R1) transmitted from the optical disk drive in (S1703). When the AV decoder detects the value of i which allows for fi(R1)=fk(R1), the AV decoder internally retains the value.

(S1706): In the processing step (S1705), in the case where the AV decoder cannot detect the value of i which allows for fi(R1)=fk(R1), the procedure goes to step (S1713). In the case where the AV decoder detects the value, the procedure goes to step (S1707).

(S1707): The optical disk drive receives a device command, "REPORT R2" command, and generates a random number based on a time variable key which is variable over time in the internal random number generating mechanism and transfers the random number to the AV decoder. In this step, in the case where the optical disk drive detects an error, the error is reported.

(S1708): In the step (S1707), in the process of executing the "REPORT R2" command, in the case where an error occurs, the procedure goes to step (S1713). In the case where the step is normally ended, the procedure goes to step (S1709).

(S1709): In the step (S1708), the AV decoder which has received the random R2 which the optical disk drive generates by the "REPORT R2" command calculates a function value gk(R2) based on a constant k (=i) already stored in step (S1705) and the random value R2 received from the optical disk drive in step (S1707).

(S1710): The AV decoder which has calculated the function value gk(R2) executes a device command, "SEND gk(R2)" command, and transfers the function value calculated in the step (S1709) to the optical disk drive. The optical disk drive which has received the function value gk(R2) calculates gk(R2) using the mutual authentication key k and the random number R2 in the function calculating circuit included therein. Thereafter, the optical disk drive compares the function value gk(R2) received from the AV decoder and the gk(R2) calculated by the internal calculating circuit. In the case where the two values are matched, a normal end is reported as the processing result. On the other hand, in the case where an error occurs during the command processing, or in the case where the received function value is not matched with the internally calculated function value, an error is reported as the command processing result.

(S1711): In the step (S1710), when the command processing result is an error, the procedure goes to step (S1713). When the command processing result is a normal end, the procedure goes to step (S1712).

(S1712): The AV decoder generates a bus key BK using the internally retained bus key generating circuit, based on the two function values fk(R1) and gk(R2) acquired in the mutual authentication processing. Similarly, the optical disk drive also generates a bus key BK using the internally retained bus key generating circuit, based on the two function values acquired in the mutual authentication processing. (Herein, the bus keys BK generated by the optical disk drive and the AV decoder in the mutual authentication processing are identical.)

(S1713): In the case where an error occurs during the execution of the device command, the error is reported and the mutual authentication processing is cancelled in this step.

By performing the mutual authentication processing in the manner as described above, key information can be transferred after the optical disk drive confirms that the data is not to be transferred to an apparatus which performs illegal copying. Thus, there is an effect of concealing the key information for performing descrambling. Therefore, an effect of preventing the scramble system from being illegally decrypted can be provided.

Furthermore, since it is possible to perform decrypting of key information and descrambling of data after confirming that the apparatus from which the AV decoder receives data does not transfer illegally copied data, an effect of preventing illegally copied data from being reproduced can be provided.

Furthermore, since a different bus key for every mutual authentication processing is generated, effects of preventing the key information from being illegally read and preventing the encrypting/scrambling system from being illegally decrypted can be provided.

Furthermore, since different functions are used between in the case where the optical disk drive authenticates the AV decoder in the mutual authentication and in the case where the AV decoder authenticates the optical disk drive, the security against the act of decrypting the mutual authentication operation system for the purpose of illegally executing the mutual authentication operation is high.

Furthermore, in the mutual authentication processing, since time variable keys generated by each of the optical disk drive and the AV decoder are used, different random number values are generated every time the mutual authentication processing is executed, different function values are transferred, and different bus keys are generated. Therefore, the security against the act of decrypting the mutual authentication operation system for the purpose of illegally executing the mutual authentication operation is high.

Furthermore, by using the mutual authentication key recorded on the information recording medium for the mutual authentication processing, the security against the act of decrypting the mutual authentication operation system for the purpose of illegally executing the mutual authentication operation is high.

Although the fourth embodiment of the information recording medium of the present invention has been described above as an example, the third embodiment of the information recording medium of the present invention can be processed in the same manner.

Industrial Applicability

The information recording medium of the present invention includes a lead-in area and a data recording area. Scrambled data recorded in the data recording area is descrambled based on the key information recorded in the lead-in area. Thus, by recording the key information in the lead-in area, security is enhanced. This is because the drive device of the information recording medium can directly access the lead-in area, while devices other than the drive device (e.g., a personal computer) cannot directly access the lead-in area. Furthermore, by recording the key information in the lead-in area, it is unnecessary to provide readout means dedicated to reading the key information.

Another information recording mediums of the present invention includes the lead-in area and the data recording area. Scrambled data is descrambled based on the first key information recorded in the lead-in area and the second key information recorded in the data recording area. Thus, since the key information for descrambling is doubled, security is enhanced.

According to the information reproducing device of the present invention, the mutual authentication processing is performed before the scrambled data is transmitted to the decoding device. By the mutual authentication processing, two components mutually confirms that the other is normal. Thus, security is enhanced.

According to the information reproducing device of the present invention, the mutual authentication processing is performed between the reading device and the decoding device. When the mutual authentication processing is normally ended, the bus key information common to the reading device and the decoding device is generated, and key information encrypted by the bus key information is transmitted from the reading device to the decoding device. In this manner, after the mutual authentication processing is performed, the common bus key is further used, so that it is mutually confirmed that the other is normal. Thus, security is enhanced.

What is claimed is:

1. An information recording medium comprising a lead-in area not accessible by devices other than a disk reproducing device and a data recording area, wherein
key information is recorded in the lead-in area,
scrambled data is recorded in the data recording area, and
the scrambled data is descrambled based on the key information.

2. An information recording medium comprising a lead-in area not accessible by devices other than a disk reproducing device and a data recording area, wherein
first key information is recorded in the lead-in area,
a plurality of second key information and scrambled data are recorded in the data recording area, and
a portion of the scrambled data is descrambled based on information obtained by converting one of the plurality of second key information based on the first key information.

3. An information recording medium according to claim 2, wherein the data recording area is divided into a plurality of sectors, each of the plurality of sectors including a sector header field not accessible by devices other than a disk reproducing device where information for identifying the sector is recorded and a main data field where the portion of the scrambled data is recorded, and a unique second key information is recorded in each sector header field for descrambling the portion of the scrambled data in the respective sector header field.

4. An information recording medium according to claim 2, wherein the first key information is encrypted information, the second key information is encrypted information which has been encrypted based on the first key information, and the information for descrambling the portion of the scrambled data is obtained by decrypting the second key information.

5. An information recording medium according to claim 4, wherein the first key information is encrypted by master key information.

6. An information recording medium according to claim 4, wherein a plurality of first key information are recorded in the lead-in area, each of the plurality of first key information is encrypted information, and the plurality of first key information are obtained by encrypting the same key information by a plurality of different master key information.

7. An information recording medium according to claim 2, wherein a scramble flag for indicating whether or not data recorded in the data recording area is scrambled is further recorded in the information recording medium.

8. An information recording medium according to claim 7, wherein the data recording area is divided into a plurality of sectors, each of the plurality of sectors including a sector header field not accessible by devices other than a disk reproducing device where information for identifying the sector is recorded and a main data field where the scrambled data is recorded, and the scramble flag is recorded in the sector header field.

9. An information recording medium according to claim 7, wherein the data recording area includes an area where a plurality of files are recorded and a file management area where information for managing the plurality of files is recorded, and the scramble flag is recorded in the file management area.

10. An information recording medium according to claim 2, wherein mutual authentication key information for performing mutual authentication between a reading device for reading the scrambled data and a decoding device including a descramble circuit for descrambling the scrambled data is further recorded in the lead-in area.

11. An information recording. medium according to claim 2, wherein the first key information indicates one of a plurality of tables each of the plurality of tables includes a plurality of bit strings, each of the plurality of bit strings identifies an initial value for generating a pseudo-random number sequence, the second key information indicates one of the plurality of bit strings included in the table indicated by the first key information, and the scrambled data is descrambled by performing a logical operation to the pseudo- random number sequence.

12. An information recording medium according to claim 2, wherein the data recording area is divided into a plurality of sectors, each of the plurality of sectors including a sector header field not accessible by devices other than a disk reproducing device where information for identifying the sector is recorded and a main data field where the scrambled data is recorded, and information for identifying use of the information recording medium is recorded in the sector header field.

13. An information reproducing device comprising:
   a reading circuit for reading scrambled data and key information to be used for descrambling the scrambled data from an information recording medium; and
   an authentication circuit for authenticating to transmit information corresponding to the key information to the decoding device before transmitting the scrambled data to the decoding device including a descramble circuit for descrambling the scrambled data.

14. An information reproducing device according to claim 13,
   wherein the information recording medium includes a lead-in area not accessible by devices other than a disk reproducing device and a data s recording area,
   the key information includes first key information recorded in the lead-in area and second key information recorded in the data recording area, and
   the lead-in area includes mutual authentication information for use by the authentication circuit.

15. An information reproducing device according to claim 13, wherein authentication by the authentication circuit is performed by using information changing over time.

16. An information reproducing device comprising:
   an authentication circuit for authenticating to receive information corresponding to key information from a reading device before receiving scrambled data from the reading device for reading the scrambled data and the key information to be used for descrambling the scrambled data from an information recording medium; and
   a descramble circuit for descrambling the scrambled data received from the reading device.

17. An information reproducing device according to claim 16,
   wherein the information recording medium includes a lead-in area not accessible by devices other than a disk reproducing device and a data recording area,
   the key information includes first key information recorded in the lead-in area and second key information recorded in the data recording area, and
   the lead-in area includes mutual authentication information for use by the authentication circuit.

18. An information reproducing device according to claim 17, wherein the descramble circuit descrambles the scrambled data based on information obtained by converting the second key information based on the first key information.

19. An information reproducing device according to claim 16, wherein authentication by the authentication circuit is performed by using information changing over time.

20. An information reproducing device comprising:
   a reading circuit for reading scrambled data and key information to be used for descrambling the scrambled data from an information recording medium;
   a decoding section including a descramble circuit for descrambling the scrambled data; and
   an authentication circuit for authenticating to transmit information corresponding to the key information to the decoding section before transmitting the scrambled data to the decoding section.

21. An information reproducing device according to claim 20, wherein a scramble flag for indicating whether or not data recorded in the data recording area is scrambled is further recorded in the information recording medium,
   the information reproducing device further comprising a control circuit for controlling whether or not the authentication circuit is to be activated depending on the scramble flag.

22. An information reproducing device according to claim 20, wherein authentication by the authentication circuit is performed by using a predetermined function.

23. An information reproducing device according to claim 20, wherein the information recording medium includes a lead-in area not accessible by devices other than a disk reproducing device and a data recording area,
   the key information includes first key information recorded in the lead-in area and second key information recorded in the data recording area, and
   the lead-in area includes mutual authentication information for use by the authentication circuit.

24. An information reproducing device according to claim 23, wherein the authentication circuit generates bus key information in the case where authentication processing is normally ended, and encrypts the first key information and the second key information using the bus key information.

25. An information reproducing device according to claim 24, wherein the authentication circuit decrypts the encrypted first key information and the encrypted second key information using the bus key information.

26. An information reproducing device according to claim 23, wherein the descramble circuit descrambles the scrambled data based on information obtained by converting the second key information based on the first key information.

27. An information reproducing device according to claim 20, wherein authentication by the authentication circuit is performed by using information changing over time.

28. An information reproduction method for reproducing scrambled data using a reading device for reading scrambled data and key information to be used for descrambling the scrambled data from an information recording medium and a decoding device including a descramble circuit for descrambling the scrambled data, the method comprising the steps of:
   performing mutual authentication processing between the reading device and the decoding device;
   generating bus key information common to the reading device and the decoding device in the case where the mutual authentication processing is normally ended between the reading device and the decoding device;
   encrypting the key information in accordance with the bus key information; and
   transmitting the encrypted key information from the reading device to the decoding device.

* * * * *

UNITED STATES PATENT AND TRADEMARK OFFICE
CERTIFICATE OF CORRECTION

PATENT NO. : 6,289,102 B1
DATED : September 11, 2001
INVENTOR(S) : H. Ueda et al.

It is certified that error appears in the above-identified patent and that said Letters Patent is hereby corrected as shown below:

<u>Title page,</u>
Item [54], "APPARATUS AND METHOD FOR PREVENTING UNAUTHORIZED USE OF INFORMATION RECORDED ON AN INFORMATION RECORDING MEDIUM" should read -- SECTOR HEADER ENCRYPTION KEY METHOD FOR PROTECTING DATA RECORDED ON A DISK --.

<u>Column 40,</u>
Line 20, delete "sector header" and insert -- main data --.
Line 62, delete "." between the words "recording" and "medium".

Signed and Sealed this

Sixth Day of August, 2002

*Attest:*

JAMES E. ROGAN
*Attesting Officer*     *Director of the United States Patent and Trademark Office*